United States Patent
Donnangelo et al.

(10) Patent No.: US 8,189,785 B2
(45) Date of Patent: May 29, 2012

(54) GENERATING IDENTICAL NUMERICAL SEQUENCES UTILIZING A PHYSICAL PROPERTY AND SECURE COMMUNICATION USING SUCH SEQUENCES

(75) Inventors: Nicholas C. Donnangelo, Purcellville, VA (US); Marvin D. Drake, Boxborough, MA (US); Christophe F. Bas, Tyngsborough, MA (US); Joseph J. Rushanan, Bedford, MA (US); David Gervais, Norwood, MA (US)

(73) Assignee: The MITRE Corporation, McLean, VA (US)

( * ) Notice: Subject to any disclaimer, the term of this patent is extended or adjusted under 35 U.S.C. 154(b) by 911 days.

(21) Appl. No.: 12/242,237

(22) Filed: Sep. 30, 2008

(65) Prior Publication Data

US 2010/0080386 A1    Apr. 1, 2010

(51) Int. Cl.
*H04K 1/00* (2006.01)
(52) U.S. Cl. ......................................... 380/256
(58) Field of Classification Search .................. 380/256
See application file for complete search history.

(56) References Cited

PUBLICATIONS

Tatarski, V.I. *Wave Propagation in a Turbulent Medium*. New York: McGraw-Hill Books, 1961.
Barros, J. et al., "Secrecy Capacity of Wireless Channels", in IEEE International Symposium on Information Theory, 2006.
Bennett, C. H. et al., "Quantum Public Key Distribution System," IBM Technical Disclosure Bulletin, 28, 1985, p. 3153-3163.
Bennett, C. H. et al., "Generalized Privacy Amplification," IEEE Transactions on Information Theory, 41, 1995, p. 1915-1935.
Bennett, C.H. et al., "Quantum Public Key Distribution Reinvented," p. 18.4-51-18.4-53, May 1987.
Bennett, C. H. et al., "Privacy amplification by public discussion," SIAM Journal on Computing. 17, 210-229, 1988.
Bloch, M. et al., "LDPC-based Secret Key Agreement over the Gaussian Wiretap Channel", in IEEE International Symposium on Information Theory, 2006.
Brassard, G. et al. "Secret key reconciliation by public discussion," in Advances in Cryptology: Eurocrypt'93 Proceedings, p. 410-423, 1993.
Buscher, D. F. et al., "Interferometric seeing measurements on Mt. Wilson: power spectra and outer scales". Applied Optics 34: 1081-1096. Feb. 1995.
Clifford, S. F., "Temporal-frequency Spectra for a Spherical wave Propagating Through Atmospheric turbulence," J. Optical Soc. Am., V. 61, N. 10, p. 1285-1292, 1971.
Colavita, M. et al., "Atmospheric Phase Measurements with the Mark III Stellar Interferometer". Applied Optics 26: 4106-4112. Oct. 1987.
Csiszar, I. et al., "On Multiterminal Secrecy Capacities," IEEE Press, p. 2051-2055, 2007.
Csiszar, I. et al., "Secrecy Capacities for Multiterminal Channel Models," in IEEE International Symposium on Information Theory, vol. 54, No. 6, Jun. 2008.

(Continued)

*Primary Examiner* — Jacob Lipman
(74) *Attorney, Agent, or Firm* — Sterne, Kessler, Goldstein & Fox PLLC

(57) ABSTRACT

Substantially identical numerical sequences known only to stations A and B are generated in a manner not subject to duplication by an eavesdropper and not subject to cryptanalytic attack because they are not derived using a mathematical function (such, as for example, factoring). The sequences are independently derived utilizing a physical phenomena that can only be "measured" precisely the same at stations A and B. Signals are simultaneously transmitted from each station toward the other through a communication channel having a characteristic physical property capable of modifying the signals in a non-deterministic way, such as causing a phase shift. Each signal is "reflected" by the opposite station back toward its station of origin. The effect of the communication channel is "measured" by comparing original and reflected signals. Measured differences are quantized and expressed as numbers.

54 Claims, 19 Drawing Sheets

PUBLICATIONS

Dana, R.A. et al., "A General Channel Model for RF Propagation Through Structured Ionization," Radio Science, 26, No. 4, p. 1059-1068, Jul.-Aug. 1991.

Fried, D. L. "Statistics of a Geometric Representation of Wavefront Distortion". Optical Society of America Journal 55: 1427-1435. 1965.

Hershey, J. E. et al., "Unconventional Cryptographic Keying Variable Management," IEEE Transactions on Communications, 43, No. 1, p. 3-6, Jan. 1995.

Hughes, R. J. et al., "Practical free-space quantum key distribution over 10 km in daylight and at night," New Journal of Physics 4 (2002) Published Jul. 12, 2002.

Ishimaru, A., "Wave Propagation and Scattering in Random Media," IEEE Press, 1978, p. 381-385.

Ishimaru, A., "Wave Propogation and Scattering Random Media and Rough Surfaces," IEEE Press, vol. 79, No. 10, p. 1359-1366, Oct. 1991.

Janwa, H. et al., "McEliese Public Key Cryptosystems Using Algebraic-Geometric Codes," Designs, Codes and Cryptography, vol. 8, No. 3, Jun. 1996.

Kazovsky, L. G., "Balanced Phase-Locked Loops for Optical Homodyne Receivers: Performance Analysis, Design Considerations, and Laser Linewidth Requirements," Journal of Lightwave Technology, vol. LT-4, No. 2, Feb. 1986, p. 182-195.

Knepp, D.L. et al., "Average Received Signal Power After Two-way Radar Propagation Through Ionized Turbulence," Radio Science, 37, No. 4, p. 1575-1596, Jul.-Aug. 1997.

Kolmogorov, A. N. "Dissipation of energy in the locally isotropic turbulence". Comptes rendus (Doklady) de l'Academie des Sciences de l'U.R.S.S. 32: 16-18. 1941.

Kolmogorov, A. N. "The local structure of turbulence in incompressible viscous fluid for very large Reynold's numbers". Comptes rendus (Doklady) de l'Academie des Sciences de l'U.R.S.S. 30: 301-305. 1941.

Koorapaty, H. et al., "Secure Information Transmission for Mobile Radio," IEEE Communications Letters, 4, No. 2, p. 52-55, Feb. 2000.

Leung-Yan-Cheong, S.K. et al.,"The Gaussian Wire-Tap Channel", IEEE Transactions on Information Theory, 24(4): 451-456, 1978.

Liu, S. et al., "Practical Protocol for Advantage Distillation and Information Reconciliation," Designs, Codes and Cryptography, vol. 30, No. 1, Aug. 2003.

Lo, H.-K., "Method for Decoupling Error Correction From Privacy Amplification," Preprint quant-ph/ 0201030, 2002.

Marcikic, I. et al., "Free-space Quantum Key Distribution with Entangled Photons," arXiv:quant-ph/0606072 v2 3 Aug. 2006.

Maurer, U., "Perfect Cryptographic Security from Partially Independent Channels," Proceedings of the 23rd ACM Symposium on Theory of Computing (STOC), p. 561-572, 1991.

Maurer, U.M. "Secret Key Agreement by Public Discussion from Common Information", IEEE Transactions on Information Theory, 39(3):733-742, 1993.

Maurer, U.M. Towards Characterizing When Information-Theoretic Secret Key Agreement Is Possible, in ASIACRYPT, Kwangjo Kim and Tsutomu Matsumoto eds, vol. 1163 of Lecture Notes in Computer Science, p. 196-209, Springer 1996.

Nightingale, N. S. et al., "Interferometric Seeing Measurements at the La Palma Observatory". Monthly Notices of the Royal Astronomical Society 251: 155-166. Jul. 1991.

Noll, R. J. "Zernike Polynomials and Atmospheric Turbulence". Optical Society of America Journal 66: 207-211. Mar. 1976.

O'Byrne, J. W. "Seeing Measurements Using a Shearing Interferometer". Publications of the Astronomical Society of the Pacific 100: 1169-1177. Sep. 1988.

Ozarow, L. H. et al., "Wire-Tap Channel II," Bell Labs Technical Journal, 63, p. 2135-2157, Dec. 1984.

Peterson, C. G., "Fast, efficient error reconciliation for quantum cryptography." Preprint quant-ph/0203096, 2002.

[RW03] Renner, R. et al., "New Bounds in Secret-Key Agreement: The Gap between Formation and Secrecy Extraction, in EUROCRYPT", Eli Biham ed., vol. 2656 of Lecture Notes in Computer Science, p. 562-577, Springer, 2003.

Renner, R. et al., "Simple and Tight Bounds for Information Reconciliation and Privacy Amplification, in ASIACRYPT", Bimal K. Roy ed., vol. 3788 of Lecture Notes in Computer Science, p. 199-216, Springer, 2005.

Van Assche, G. et al, "Reconciliation of a quantum-distributed Gaussian Key", IEEE Transactions on Information Theory, 50(2):394-400, 2004.

GENERATING IDENTICAL NUMERICAL SEQUENCES UTILIZING A PHYSICAL PROPERTY AND SECURE COMMUNICATION USING SUCH SEQUENCES

BACKGROUND OF THE INVENTION

1. Field of the Invention

The present invention relates in general to secure communication. More particularly, it relates to the creation of encryption keys.

2. Background Art

Public key cryptosystems are ubiquitous in commerce, banking, and many government functions. Secure encrypted communication requires that an encryption key be 1) nondeterministic (i.e., random) and 2) securely distributed. Modem public key cryptosystems based on RSA or Diffie Hellmen for many years fulfilled both requirements and are elegant in their simplicity. Public key cryptosystems generally derive their security from the use of an encryption key that is based on the computational intractability of a mathematical problem (e.g., factoring or solving discrete logarithms).

However, brute force computational attacks have resulted in surprising success, most recently the factorization of a 193 digit integer in November 2005 using a configuration of 802.2 GHz Opteron processors over about a 6 month period. Additionally, quantum computers could exploit superposition to factor integers in polynomial time. Several approaches have been investigated for securely distributing random bit sequences (i.e., cryptographic keys) in a quantum-computing environment, including both mathematical operations not susceptible to attack by Shor's algorithm and quantum cryptography.

Cryptosystems that exploit physical one-way functions, instead of computationally unsolvable (by today's standards) math problems, would not be vulnerable to a computing attack—even those mounted by a quantum computer. Instead of being based on an algorithm that can be inverted, these systems exploit physical randomness that is only, to a high probability, observable to the legitimate communicating parties to establish the shared secret. There is therefore a need for cryptosystems that exploit physical layer randomness and security.

Quantum Cryptography

Quantum cryptography uses randomness at the physical layer to establish and distribute a secret. In quantum cryptography, the randomness extracted from the physical layer is based on ambiguity in the measured states of single photons. Quantum Key Distribution (QKD) is a form of quantum cryptography that originated in the work of Bennett and Brassard, Bennett, C. H. and G. Brassard, "Quantum cryptography: Public key distribution and coin tossing," in Proceedings of the IEEE International Conference on Computers, Systems and Signal Processing, Bangalore, India, Dec. 10-12, 1984, pp. 175-179. This work resulted in the development of a cryptographic protocol, BB84. In the creation of this cryptographic protocol, information theory and quantum physics were wed together to bound the secrecy capacity of a quantum channel based on observable quantum bit error rate. As such, it is theoretically possible to guarantee that a third party would possess a vanishingly small amount of information about secret bits reconciled by the two communicating parties.

At the time of the writing of this patent document, BB84 is the most experimentally mature quantum cryptography protocol and offers unprecedented security guarantees. However, these security guarantees come with a cost. Generation and detection of single photons requires specialized equipment, and even the most capable experimental (and now commercial systems) are limited in range to about 75 kilometers of optical fiber. Free space optical QKD systems can close terrestrial links, but require a quiescent quantum channel, i.e. secret bit yields rapidly falls to zero in cases of precipitation, atmospheric turbulence and fog. There are other forms of quantum cryptography, including those based on Einstein, Polensky and Rosen (EPR) pairs. Physical realizations of these alternative protocols may offer certain advantages when compared to Bennett and Brassard protocol, but are subject to the same quiescent channel assumptions.

Wyner's Wiretap Channel

The concept of using attributes of the classical channel to establish a shared secret between two communicating parties originates with Wyner's [Wyner, A. D., "The Wire-Tap Channel," Bell System Technical Journal, 54, pp. 1355-1387, October 1975.] seminal work on wire-tap channels.

Wyner considered the case where Station A and Station B communicate over a noisy channel. A eavesdropper may eavesdrop on that communication through a second channel that is also noisy. Wyner proved that Station A and Station B may agree on an encoding/decoding scheme that leaks only a small and bounded amount of information to the eavesdropper. In essence, as long as Station A and Station B have a signal-to-noise advantage over the eavesdropper, they may securely extract secret bits, placing an upper bound on the eavesdropper's knowledge; the greater the signal to noise advantage the greater the secrecy capacity. Wyner's original paper establishes a secrecy capacity for this scenario, analogous to the communication capacity in information theory.

Wyner's work influenced and motivated a variety of shared secret schemes that have since emerged. Ozarow and Wyner [Ozarow, L. H. and A. D. Wyner, "Wire-Tap Channel II," Bell Labs Technical Journal, 63, pp. 2135-2157, December 1984.] considered the case where the eavesdropper is allowed to sample a set number of bits in the channel of Station A and Station B, as opposed to seeing some of the bits randomly. Ozarow and Wyner found that even in that case, it is possible to construct codes that bound the eavesdropper's knowledge.

Maurer and the Definition of Secrecy Efficiency

Maurer [Maurer, U., "Perfect Cryptographic Security from Partially Independent Channels," Proceedings of the 23rd ACM Symposium on Theory of Computing (STOC), pp. 561-572, 1991.] also considers the general problem of Station A and Station B communicating secretly in the presence of the eavesdropper. Here the channel of Station A and Station B is independent of the eavesdropper's channel, though the latter channel may be less noisy (in contrast with the scenario considered in the Wyner work described above. Even if the eavesdropper's channel is less noisy, Station A and Station B may still communicate securely.

These results are expanded in Maurer, U., "Secret Key Agreement by Public Discussion," IEEE Transactions on Information Theory, 39, No. 3, pp. 733-742, 1993. The notion of secrecy capacity is defined and used to achieve capacity bounds under general binary channels. One relevant finding by Maurer is that two-way communication between Station A and Station B may enhance their secrecy capacity. A central theme in the Maurer work is that noisy channels aid secrecy capacity. The results on secrecy capacity are extended further in [Maurer, U. and S. Wolf, "Unconditionally Secure Key Agreement and the Intrinsic Conditional Information," IEEE Transactions on Information Theory, 45, No. 2, pp. 499-514, 1999].

Mobile Radio Channel

In 1995, Hershey and Hassan [Hershey, J. E., A. A. Hassan, and R. Yarlagadda, "Unconventional Cryptographic Keying Variable Management," IEEE Transactions on Communications, 43, No. 1, pp. 3-6, January 1995.] proposed using an urban UHF channel that is highly time varying (multipath from mobile phones) to establish and securely distribute binary sequences. Their idea is to have Station A and Station B communicate in such a way that they measure the same multipath induced signal fading. Provided that the eavesdropper is not physically collocated with Station A or Station B, and the environment is dynamic and sufficiently complex— i.e., urban canyons—the eavesdropper has very little chance of observing or computing the same channel and thus measuring the same quantity. Their idea of using multipath for secure communication is developed further in [Hassan, A. A., W. E. Stark, J. E. Hershey, and S. Chennakeshu, "Cryptographic Key Agreement for Mobile Radio," Digital Signal Processing, 6, pp. 207-212, 1996. and [KH000].

Other literature relating in general to this background information include:

Buscher, D. F.; Armstrong, J. T., Hummel, C. A., Quirrenbach, A., Mozurkewich, D., Johnston, K. J., Denison, C. S., Colavita, M. M., & Shao, M. "Interferometric seeing measurements on Mt. Wilson: power spectra and outer scales". Applied Optics 34: 1081-1096. February 1995.

Bennett, C. H. and G. Brassard, "Quantum public key distribution system," IBM Technical Disclosure Bulletin, 28, 1985, pp. 3153-3163.

Bennett, C. H., G. Brassard, C. Crepeau, and U. M. Maurer, "Generalized Privacy Amplification," IEEE Transactions on Information Theory, 41, 1995, pp. 1915-1935.

Bennett, C. H., G. Brassard and J.-M. Robert, "Privacy amplification by public discussion," SIAM Journal on Computing. 17, 210-229, 1988.

Brassard, G. and L. Salvail, "Secret key reconciliation by public discussion," in Advances in Cryptology: Eurocrypt'93 Proceedings, pp. 410-423, 1993.

Clifford, S. F., "Temporal-frequency Spectra for a Spherical wave Propagating Through Atmospheric turbulence," J. Optical Soc. Am., V. 61, N. 10, pp. 1285-1292, 1971.

Colavita, M. M.; Shao, M., & Staelin, D. H. "Atmospheric phase measurements with the Mark III stellar interferometer". Applied Optics 26: 4106-4112. October 1987.

Imre Csiszar and Prakash Narayan, Secrecy Capacities for Multiterminal Channel Models, in IEEE International Symposium on Information Theory, 2007.

Dana, R. A. and L. A. Wittwer, "A General Channel Model for RF Propagation Through Structured Ionization," Radio Science, 26, No. 4, pp. 1059-1068, July-August 1991.

Fried, D. L. "Statistics of a Geometric Representation of Wavefront Distortion". Optical Society of America Journal 55: 1427-1435. 1965.

Hershey, J. E., A. A. Hassan, and R. Yarlagadda, "Unconventional Cryptographic Keying Variable Management," IEEE Transactions on Communications, 43, No. 1, pp. 3-6, January 1995.

Hughes, R. J., Nordholt, J. E., Derkacs, D. and Peterson, G., "Practical free-space quantum key distribution over 10 km in daylight and at night," New Journal of Physics 4 (2002) Published 12 Jul. 2002.

Ishimura, A., "Wave Propagation and Scattering in Random Media," IEEE Press, 1978, pp. 381-385.

Janwa, Heeralal and Moreno, Oscar, "McEliese Public Key Cryptosystems Using Algebraic-Geometric Codes," Designs, Codes and Cryptography, Vol. 8, No. 3, June 1996.

Kolmogorov, A. N. "Dissipation of energy in the locally isotropic turbulence". Comptes rendus (Doklady) de l'Academie des Sciences de l'U.R.S.S. 32: 16-18. 1941.

Kolmogorov, A. N. "The local structure of turbulence in incompressible viscous fluid for very large Reynold's numbers". Comptes rendus (Doklady) de l'Academie des Sciences de l'U.R.S.S. 30: 301-305. 1941.

Kazovsky, L. G., "Balanced Phase-Locked Loops for Optical Homodyne Receivers: Performance Analysis, Design Considerations, and Laser Linewidth Requirements," Journal of Lightwave Technology, Vol. LT-4, No. 2, February 1986, pp. 182-195.

Knepp, D. L. and W. A. Brown, "Average Received Signal Power After Two-way Radar Propagation Through Ionized Turbulence," Radio Science, 37, No. 4, pp. 1575-1596, July-August 1997.

H. Koorapaty, A. A. Hassan and S. Chennakeshu, "Secure Information Transmission for Mobile Radio," IEEE Communications Letters, 4, No. 2, pp. 52-55, February 2000.

Lo, H.-K., "Method For Decoupling Error Correction From Privacy Amplification," Preprint quant-ph/0201030, 2002.

Maurer, U., "Perfect Cryptographic Security from Partially Independent Channels," Proceedings of the 23rd ACM Symposium on Theory of Computing (STOC), pp. 561-572, 1991.

Marcikic, I., Lamas-Linares, A., and Kurtsiefer, C., "Free-space quantum key distribution with entangled photons," arXiv:quant-ph/0606072 v2 3 August 2006.

Noll, R. J. "Zernike polynomials and atmospheric turbulence". Optical Society of America Journal 66: 207-211. March 1976.

Nightingale, N. S.; Buscher, D. F. "Interferometric seeing measurements at the La Palma Observatory". Monthly Notices of the Royal Astronomical Society 251: 155-166. July 1991.

O'Byrne, J. W. "Seeing measurements using a shearing interferometer". Publications of the Astronomical Society of the Pacific 100: 1169-1177. September 1988.

Ozarow, L. H. and A. D. Wyner, "Wire-Tap Channel II," Bell Labs Technical Journal, 63, pp. 2135-2157, December 1984.

Peterson, C. G., "Fast, efficient error reconciliation for quantum cryptography." Preprint quant-ph/0203096, 2002.

Tatarski, V. I. Wave Propagation in a Turbulent Medium. McGraw-Hill Books. 1961.

Gilles Van Assche, Jean Cardinal, and Nicolas J. Cerf, Reconciliation of a quantum-distributed Gaussian key, IEEE Transactions on Information Theory, 50(2):394-400, 2004.

M. Bloch, A. Thangaraj, S. McLaughlin, and J.-M. Merolla, LDPC-based secret key agreement over the Gaussian wire-tap channel, in IEEE International Symposium on Information Theory, 2006.

Joao Barros and Miguel R. D. Rodrigues, Secrecy Capacity of Wireless Channels, in IEEE International Symposium on Information Theory, 2006.

S. K. Leung-Yan-Cheong and M. E. Hellman, The gaussian wire-tap channel, IEEE Transactions on Information Theory, 24(4): 451-456, 1978.

Ueli M. Maurer, Secret key agreement by public discussion from common information, IEEE Transactions on Information Theory, 39(3):733-742, 1993.

Ueli M. Maurer and Stefan Wolf, Towards Characterizing When Information-Theoretic Secret Key Agreement Is Possible, in ASIACRYPT, Kwangjo Kim and Tsutomu Matsumoto eds, volume 1163 of Lecture Notes in Computer Science, pp. 196-209, Springer 1996.

[RW03] Renato Renner and Stefan Wolf, New Bounds in Secret-Key Agreement: The Gap between Formation and Secrecy Extraction, in EUROCRYPT, Eli Biham ed., volume 2656 of Lecture Notes in Computer Science, pp. 562-577, Springer, 2003.

Renato Renner and Stefan Wolf, Simple and Tight Bounds for Information Reconciliation and Privacy Amplification, in ASIACRYPT, Bimal K. Roy ed., volume 3788 of Lecture Notes in Computer Science, pp. 199-216, Springer, 2005.

Shengli Liu, Van Tilborg, Henk C. A. and Van Dijk, M., "Practical Protocol for Advantage Distillation and Information Reconciliation," Designs, Codes and Cryptography, Volume, 30, Number 1, August 2003.

BRIEF SUMMARY OF THE INVENTION

The invention provides, among other things, a method of generating substantially identical numerical sequences at stations A and B. First, an incident first beam is transmitted from station A to station B through a communication channel having a physical property capable of modifying the incident first beam in a non-deterministic manner. This incident beam is reflected from station B back toward station A, forming a reflected first beam. At station A, the incident first beam and reflected first beam are compared to determine a first beam phase difference between the incident and reflected beams. At station A, the first beam phase difference is quantized into a number based on predetermined criteria. Substantially simultaneously with the first transmitting, an incident second beam is transmitted from station B to station A through the physical communication channel and reflected from station A back toward station B, forming a reflected second beam. At station B, the incident second beam and reflected second beam are compared to determine a second beam phase difference between them. At station B, the second beam phase difference is quantized into a number based on the predetermined criteria. These steps are repeated in order to generate a series of numbers at both station A and station B, which are substantially identical because the incident first and second beams are subject to identical changes by traveling substantially identical paths.

These identical series of numbers may be used to generate encryption keys that can be used for secure communication via any communication channel.

Additional features and advantages of the present invention, as well as the structure and operation of various embodiments of the present invention, are described in detail below with reference to the accompanying drawings.

BRIEF DESCRIPTION OF THE DRAWINGS/FIGURES

DETAILED DESCRIPTION OF THE INVENTION

Figure 1:
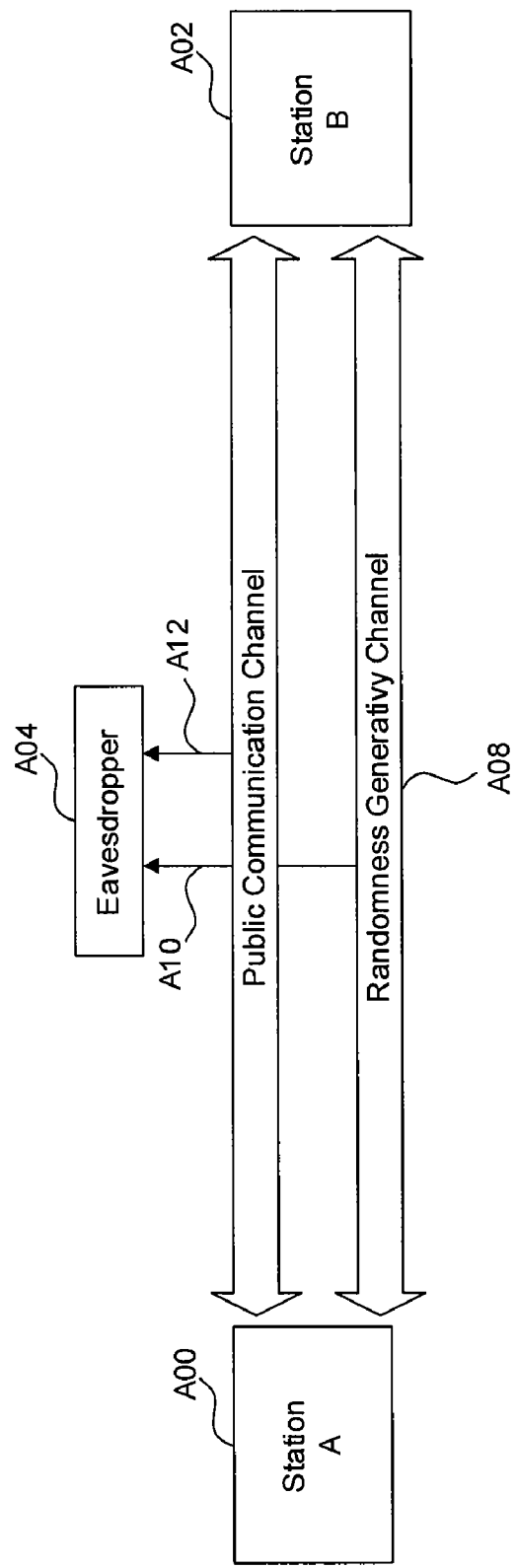
FIG. 1 illustrates a public communication channel and a randomness generation channel in accordance with one embodiment of the present invention.

The present invention provides a method and a system for extracting randomness from a stochastic physical process and generating substantially identical random numerical sequences known (to a bounded probability) only to terminals A and B. These sequences may be used to generate encryption keys for secure communication that are not subject to computational attack because they are not derived using a mathematical one way function (such, as for example, factoring). The numerical sequences are independently derived utilizing a physical phenomena that may only be, to a bounded probability, "measured" precisely the same by stations A and B. The numerical sequences, therefore, may not be duplicated by an eavesdropping observer. The numerical sequences are developed by harnessing and exploiting a naturally occurring chaotic process, such as, for example, turbulent mixing in the atmosphere between stations A and B. Ideally, the numerical sequences are developed by exploiting, for example, turbulent mixing in the ionosphere between stations A and B.

Signals are simultaneously transmitted from each of stations A and B toward the other station through a communication channel having a characteristic physical property that is capable of modifying the signals in a non-deterministic way, such as, for example, causing an amplitude or phase shift of a certain magnitude. Each signal is "reflected" by the opposite station back toward its station of origin. The effect of the communication channel is "measured" by comparing the originally transmitted signal with the "reflected" signal. Using a quantization process, the measured difference is expressed as a number. In one embodiment of the present invention, a table of numbers based on quantized ranges of phase difference may be used to express the measured difference as a number. This process is repeated as often as necessary to generate a string of numbers of a desired length at each station. From these identical strings of random numbers, encryption keys may be generated that, to a bounded probability, are known only to A and B. These keys may then be used to securely communicate in accordance with any technique making use of such keys. Keys are generated de novo based on randomness at the physical layer and thus are substantially immune to computational cryptanalytic attacks, including those implemented on a quantum computer.

The present invention provides a method of generating substantially duplicate identical numerical sequences at stations A and B, wherein the method includes the step of transmitting an incident first beam from station A to station B through a communication channel having a physical property capable of inducing a measurable change in the transmitted beams. The physical property in the communication channel refracts and modulates the incident first beam as it is transmitted to station B. The incident first beam is reflected at station B toward station A, forming a reflected first beam. Station A then receives the reflected first beam and determines the first beam phase difference between the incident first beam and the reflected first beam. Station A quantizes the first beam phase difference into one number in one of the substantially identical numerical sequences based on predetermined criteria.

The method likewise includes the step of transmitting an incident second beam from station B to station A through the communication channel at a time substantially simultaneously with the first transmitting from station A (the degree of time synchronization being much less than the time constant of the modifying channel phenomena). The physical property in the communication channel refracts and modulates the incident second beam as it is transmitted to station B. The incident second beam is reflected at station A toward station B, forming a reflected second beam. Station B then receives the reflected second beam and determines the second beam phase difference between the incident second beam and the reflected second beam. Station B quantizes the second beam phase difference into one number in the other of the substantially identical numerical sequences based on predetermined criteria. The method further includes the step of repeating the above mentioned procedure to generate other numbers in the substantially identical numerical sequences.

The present invention further provides a method of encrypting communication between party A at station A and party B at station B. According to one embodiment of the present invention, station A and station B generate keys from the numerical sequences, which may used to encrypt communication using any of several methods known to those of ordinary skill in the art.

The present invention further provides for the possibility of utilizing any of several methods to correct errors between the random sequence held by station A and that held by station B and further provides a guarantee of private communication by bounding the information available to an eavesdropper. The present invention additionally provides for the utilization of mutual authentication by stations A and B. According to one embodiment of the present invention, A and B may authenticate each other using a numerical sequence derived from a previous communication session. Mutual authentication may be accomplished based on the direct path reception of a numerical sequence derived from the previous key exchange.

The present invention provides a system and method for generating and securely distributing substantially identical numerical sequences from randomness of physical phenomena. These numerical sequences may be used as encryption keys. The methods described herein provide a secret sharing protocol where Station A and Station B securely establish and distribute a random binary sequence even in the presence an eavesdropper Eve. Unlike conventional public key encryption methods, the random sequence Station A and Station B establish and distribute is not based on the integrity of pre-existent secrets or the assumed intractability of mathematically hard problems on current or future computing engines. Unlike quantum cryptography, where the randomness is derived from quantum mechanical measurements, the security of the method is based on a physical randomness expressed in an optical channel. For example, in one embodiment, a laser beam transmitted between Station A and Station B is subjected to phase distortion incidental to atmospheric turbulence. Because its randomness and security are derived from a physical phenomenon, the prescribed method of communication is immune to computational cryptanalytic attacks. In another embodiment, the beam consists of radio frequency transmissions.

The accompanying drawings, which are incorporated herein and form part of the specification, illustrate the present invention and, together with the description, further serve to explain the principles of the invention and to enable a person skilled in the pertinent art to make and use the invention.

Optical Protocol

FIG. 1 is an illustration of a public communication channel and a randomness generation channel in accordance with one embodiment of the present invention. FIG. 1 shows the two separate channels over which over which Station A A00 and Station B A02 communicate. The distinction of two channels A06 and A08 is made for conceptual purposes. In actuality, both channels A06 and A08 could use the same physical medium. The optical protocol according to the invention "extracts" randomness out of a randomness generating channel A08 to enable the communicating parties to establish and distribute a shared secret. There are three fundamental traits that the randomness providing channel A08 possesses. First, the channel, when discretized, exhibits non-deterministic, bit-to-bit independence (randomness). Second, the channel looks substantially the same to Station A and to Station B ("reciprocity") and lastly, it possesses statistical attributes such that an unauthorized third party observing the communication A04 will only be able to recover a vanishingly small amount of information reconciled by Station A A00 and Station B A02 (confidentiality). These three traits allow Station A A00 and Station B A02 to observe the same measurements using mechanisms that depend only on the randomness generating channel A08. It is the likelihood that their measurements are substantially the same that ensures a shared key, and it is the randomness and time varying uniqueness in the randomness generating channel A08 that ensures the key is secure and non-deterministic. In Quantum key Distribution, Station A and Station B also exploit randomness at the physical layer, but the randomness is derived from the ambiguity of measuring the states of single photons, not from the randomness generating channel A08. In fact, the optical transmission medium, free space or fiber optic cabling used in quantum cryptography is made as benign as possible to ensure that Station A's single photons actually arrive at Station B's measurement apparatus without channel errors. In the optical protocol according to the invention, the greater the channel noise, the higher the secrecy capacity, provided that the conditions for reciprocity are maintained.

Station A A00 and Station B A02 interact with each other over a terrestrial free space optical randomness generating channel A08 that exhibits non-deterministic, time varying variations in the index of refraction consequential to thermodynamically driven turbulent mixing. Also in FIG. 1 is a separate communication channel A06 that Station A A00 and Station B A02 use to exchange messaging for the secret sharing protocol. This public channel A06 is assumed to be authenticated but need not be encrypted, i.e., information shared by Station A A00 and Station B A02 over the authenticated public channel is assumed to be known by the eavesdropper A04. Station A A00 and Station B A02 must also be able to tell if messages are injected or modified. That is, the integrity of the messages between Station A A00 and Station B A02 is assumed even though the content of the messages is assumed to be public.

FIG. 1 further shows how the eavesdropper A04 can possibly interact with the noisy optical transmission randomness generating channel A08 and may extract some information about the measurements Station A A00 and Station B A02 make. The eavesdropper A04 could also potentially interact with the unrestricted "public communication" channel A06 used for error correction. The channel characteristics bound the amount of information recoverable by the eavesdropper A04, even assuming her most advantageous position.

Optical Protocol Processing

Figure 2:
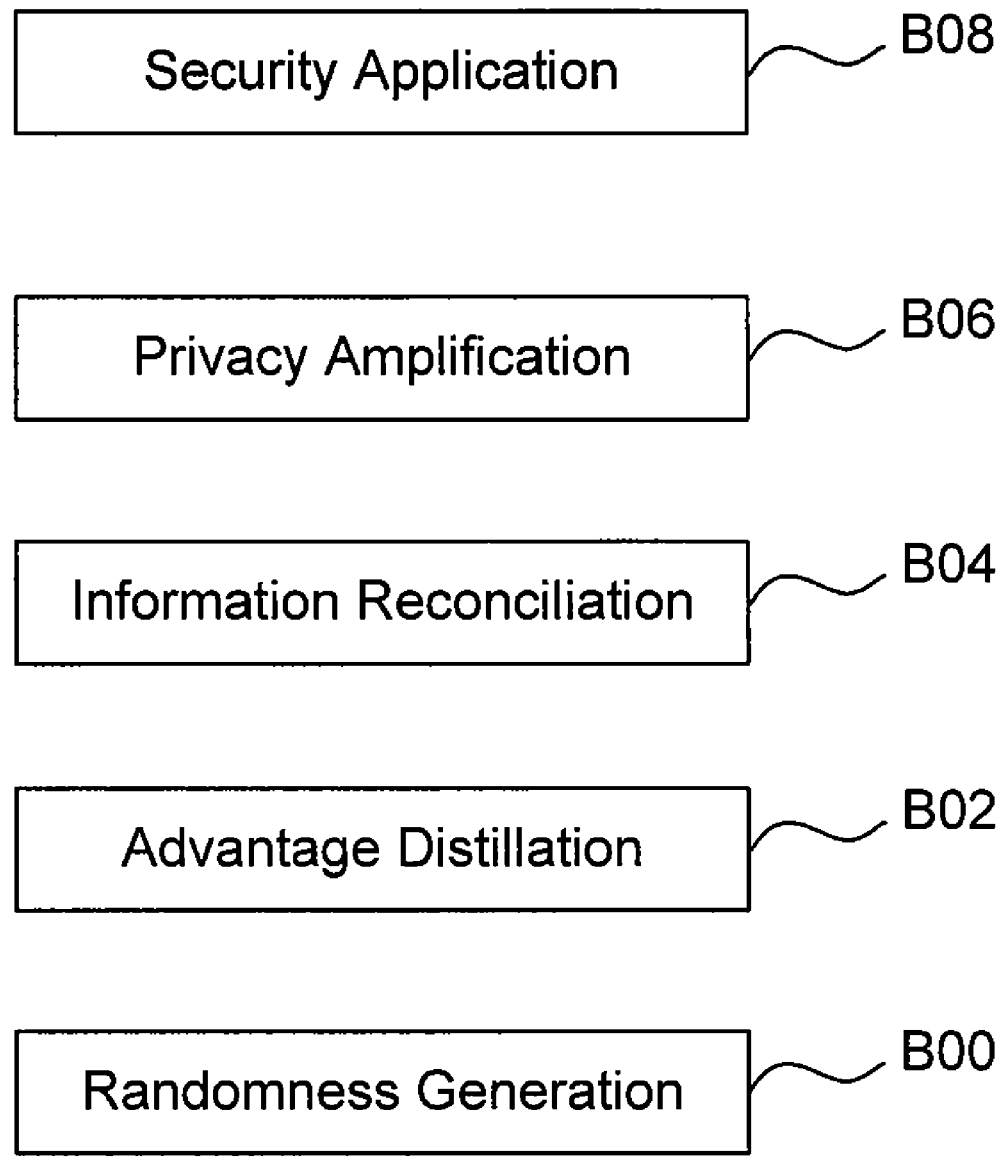
FIG. 2 shows a optical protocol stack in accordance with one embodiment of the present invention.

An optical protocol stack is shown in FIG. 2. The bottom layers use the randomness generation physical channel, and the upper layers use the public messaging channel.

Randomness Generation B00

The bottom or physical layer of the protocol B00 uses an interactive procedure between Station A A00 and Station B A02 to "extract randomness" from the physical channel A08. In general, Station A A00 and Station B A02 will obtain a set of measurements that will be both random and yet predominantly in agreement. It is these measurements from which the mutually agreed upon secret key may be derived.

Moving up the protocol stack, information-theoretic post processing generally consists of three phases: (i) advantage distillation B02, (ii) information reconciliation B04 and (iii) privacy amplification B06.

Advantage Distillation B02

Advantage distillation (B02) may be needed in the case when two legitimate users, Station A and Station B, start in a situation that is inferior to that of the eavesdropper. The aim for them is to gain advantage over the eavesdropper in terms of mutual information between each other.

Information Reconciliation B04

Provided protocol assumptions are met, i.e., atmospheric turbulence exceeds a threshold value and is measured on relatively short time intervals, Station A-to-Station B's physical measurements are reciprocal, but bit errors are still anticipated. Error correction may be used to simultaneously locate and correct inconsistent bit values in the sequences held by Station A A00 and Station B A02.

There are numerous references for performing this reconciliation from the literature [L02, P02, A0004, BTMM06]. A common theme in these error correction protocols is for Station A to send to Station B A02 the "syndrome" of her vector with respect to some error-correcting code. Equivalently, she might send the offset of her vector with respect to the code, that is, the difference between her input and the nearest codeword. Station B A02 may then use that information to compute Station A's A00 vector using his own nearby version of it.

An alternative approach, proposed by Assche et al. [A0004] for reconciling Gaussian-distributed vectors, is for Station A A00 and Station B A02 to convert their real-valued vectors into a sequence of binary vectors and then use a protocol tailored to symmetric binary errors, such as "CASCADE" [BS93].

Information reconciliation B04 may be adaptive to the physical parameters that govern the physical measurements, such as atmospheric conditions. For example, methods based on forward error correction block codes may adjust their coding rates based on the level of bit errors that are expected based on these physical parameters.

Information reconciliation methods may include pre-processing, such as interleaving, to further mitigate the bit errors created by the physical measurement. The level and nature of interleaving may be based on the physical parameters, such as atmospheric conditions, that govern the generation of physical measurements by Station A and Station B.

Privacy Amplification B06

After error correction, Station A and Station B each possess the same string of random values, but the error correction process may have revealed parity bits that could represent a leakage of entropy to the eavesdropper. The eavesdropper may have obtained partial information about the atmosphere's state through remote measurements. In privacy amplification, the sequence of identical bits held by Station A and Station B are reduced to a smaller string by hashing. The amount of information the eavesdropper obtains from the resulting smaller string becomes vanishingly small [BBCM95].

The degree of privacy amplification may be based on estimates of the bit errors before information reconciliation and the resulting amount of redundancy needed to correct those errors. Specifically, some measure of the information content after information reconciliation may be used. Examples of such measures include Shannon entropy and Renyi entropy. The level of information may dictate the strength of the hash function that would be used for the privacy amplification.

In the most potent eavesdropper attack, the eavesdropper puts a beam splitter between Station A and Station B. The eavesdropper is thus able to measure the phase from Station A to the beam splitter and Station A to Station B to the beam splitter. Given the measure of information in the shared strings of random bits after information reconciliation and the level of hashing, it may be possible under some assumptions to give a bound on the amount of information that the eavesdropper could know about these final shared strings. This bound would provide a quantified metric as to the overall security of the protocol. Measuring biases in signal to noise ratio may be a way for Station A and Station B to detect the presence of the eavesdropper. In fact, Station A and Station B can adjust their lasers to only transmit beams having just enough signal energy to close the loop with sufficient signal to noise ratio for Station A and Station B to communicate as needed to generate sequences. This "minimal" signal to noise ratio would be insufficient for the eavesdropper to extract what would be needed to obtain those sequences.

Assuming the eavesdropper is very close to Station A or Station B (within a few centimeters in most cases) and is absolutely still (since approximately 800 nanometers of motion equates to pi degrees of phase shift), if some of Station A's light energy is bled off in the eavesdropper's beam splitter, Station A's signal to noise ratio will suffer. Lower signal to noise ratio will lead to higher bit error rates. The degree of privacy amplification may be adjusted to compensate for bit errors. The degree of privacy amplification is additionally related to the atmospheric conditions. For example, a more quiescent atmosphere (Cn2~10-15 for a cold, clear night) would in principal require more hashing (and lower bit yields) than hot, daytime conditions (Cn2~10-12).

The level of hashing needed for privacy amplification may be derived by estimates of entropy, which is the combination of three separate terms. The first input term for entropy is the entropy estimated in the original quantized bits derived from the phase measurements. This entropy is a function of atmospheric conditions and how much variation there is in the phase values. The second term for the total entropy is the amount of information revealed during information reconciliation, which relates to the error rate between stations A and B; this term reduces the original entropy estimation. The final term is an estimate of information that the eavesdropper may possess, which may be estimated as reduction in signal-to-noise ratios, as discussed previously. This final term also reduces the total entropy. The resulting hashing is chosen to achieve a final level of entropy using a user-specified security level and the final estimate of entropy in the shared sequences.
Security Application B08

After the above steps, Station A and Station B have a shared string of random bits for which the eavesdropper has very limited knowledge (with an upper bound). This random string may now be subjected to final quality checking and used to initiate a cryptographic protocol (encryption, signature schemes, etc.). The quality checking may include a variety of standard randomness tests.

Figure 3:
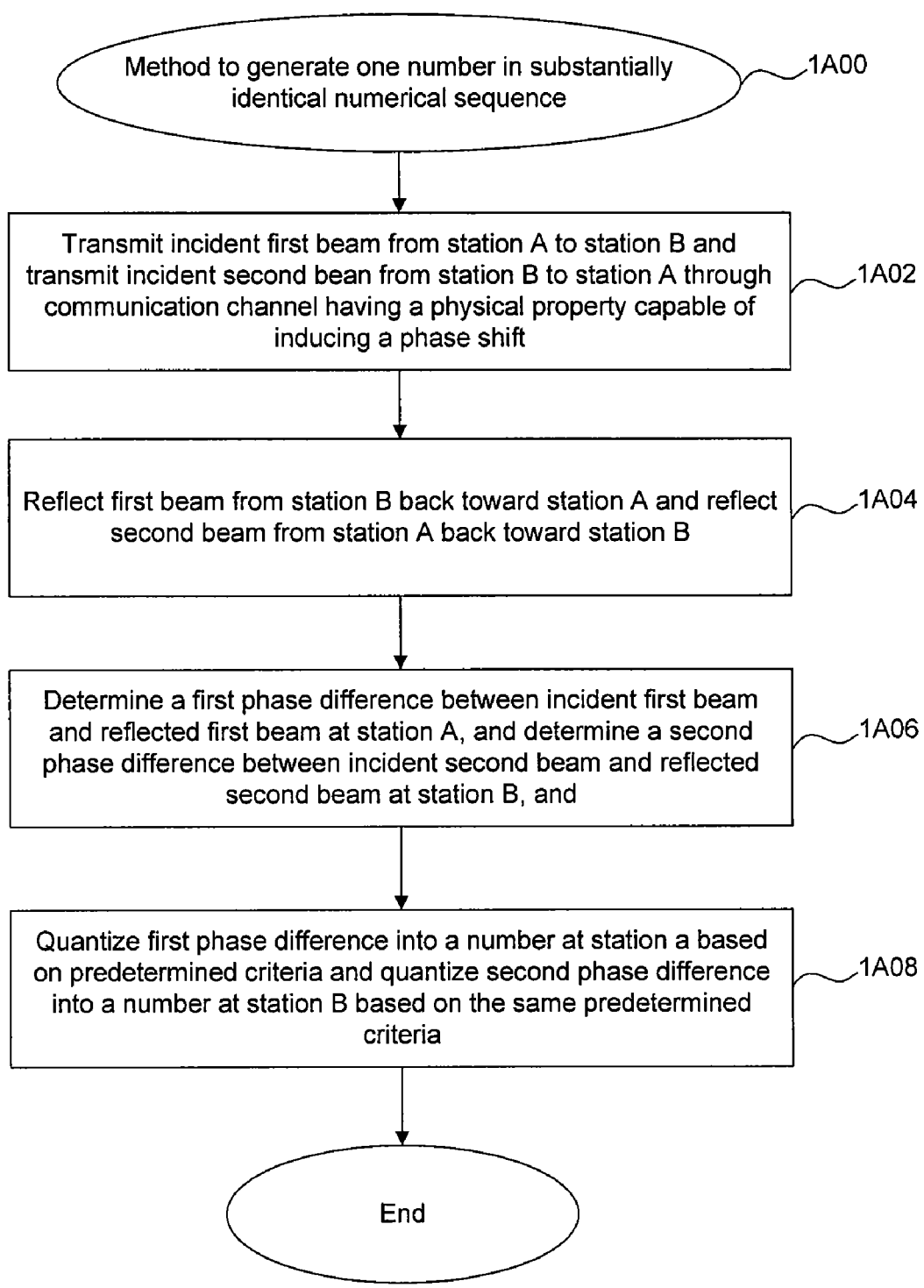
FIG. 3 is an illustration of a method 1A00 to generate one number in a numerical sequence at each of stations A and B, where the numerical sequences are substantially identical.

FIG. 3 is a flowchart of a method 1A00 to generate one number of a numerical sequence at each of stations A and B, where the numerical sequences are substantially identical. Step 1A02 is initiated to begin the method of generating a number in a numerical sequence by transmitting an incident first beam from station A to station B and an incident second beam from station B to station A. Step 1A04 is initiated after incident first beam reaches station B and incident second beam reaches station A. Step 1A04 generates reflected first beam from incident first beam and generates reflected second beam from incident second beam. Step 1A06 is initiated once reflected first beam reaches station A and reflected second beam reaches station B. Step 1A06 results in the generation of first phase difference at station A and second phase difference at station B. Step 1A08 is initiated once first phase difference and second phase difference have been calculated and results in the generation of a number in a numerical sequence. Method 1A00 may be repeated to generate each number in two substantially duplicate numerical sequences at stations A and B.

Figure 4:
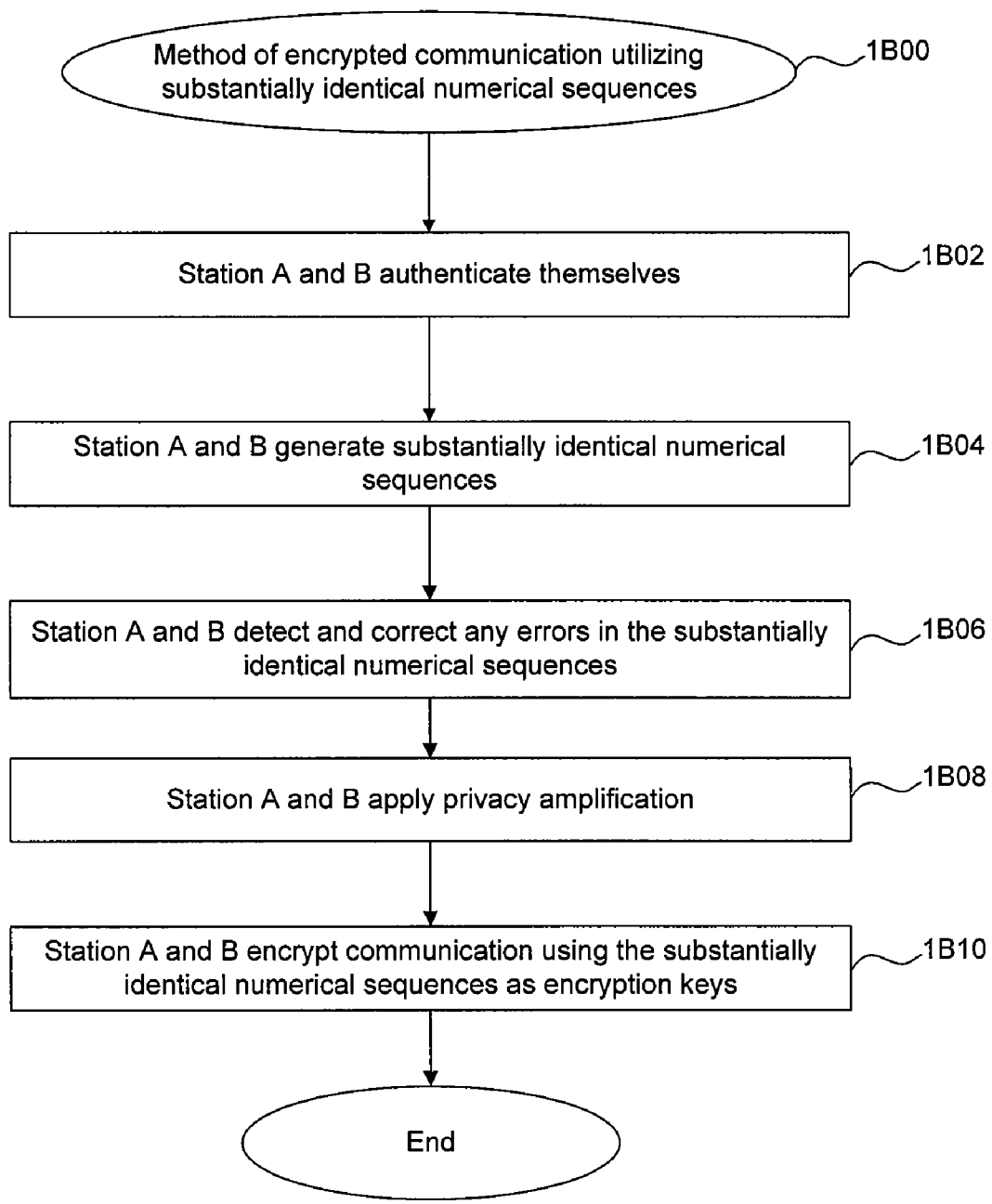
FIG. 4 is a flowchart of a method 1B00 of encrypted communication utilizing substantially identical numerical sequences.

FIG. 4 is a flowchart of a method 1B00 of encrypted communication utilizing substantially identical numerical sequences. Before communicating, stations A and B may authenticate themselves 1B02 using any of several authentication methods, including utilizing secret bits, known only to A and B, from a previous communication session. After stations A and B have authenticated themselves, stations A and B generate substantially identical numerical sequences 1B04, which may be used as encryption keys. These substantially identical numerical sequences may be generated, for example, by repeating the process according to method 1A00 in FIG. 3 until the desired number of random numbers have been generated. Stations A and B may then optionally detect and/or correct any errors 1B06 in the substantially identical numerical sequences, using any number of error detection and correction methods known to those of skill in the art. Stations A and B may use, for example, a parity check. Stations A and B may then apply privacy amplification 1B08, for example, by reducing the substantially identical numerical sequences smaller strings by hashing. Stations A and B may then encrypt any communication over a public channel using the substantially identical numerical sequences obtained from the above process as encryption keys 1B10.

Figure 5:
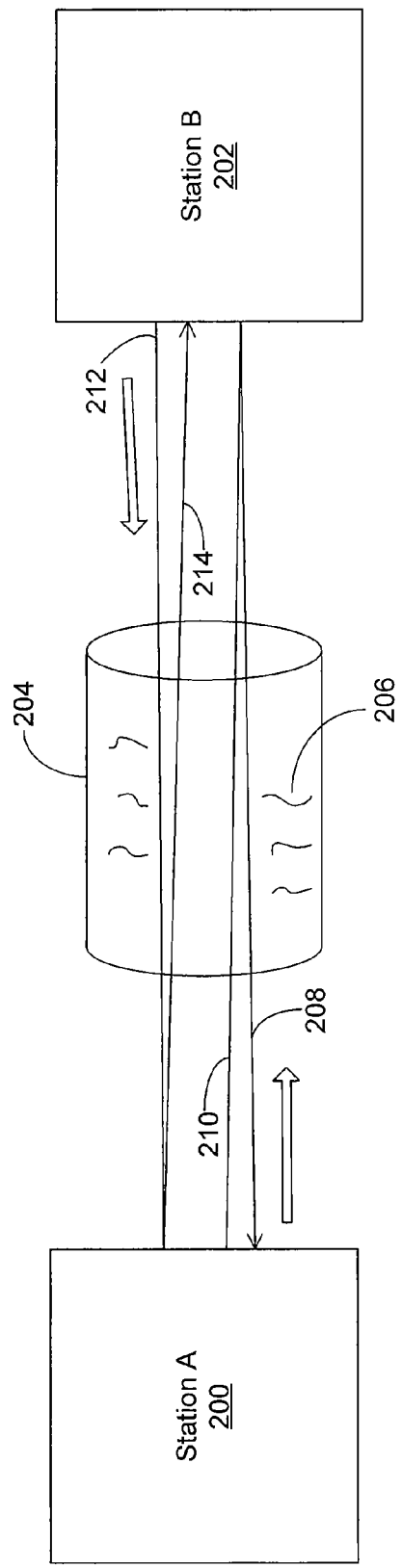
FIG. 5 is an illustration explaining the operation of an exemplary embodiment of the present invention.

FIG. 5 schematically explains some core principles of the invention. In this embodiment of the invention, station A 200 communicates with station B 202 through physical communication channel 206 having physical property 206 capable of inducing a non-deterministic change in a transmitted signal, such as, for example, a phase shift in a transmitted beams. Station A 200 transmits an incident first beam 208, such as, for example a laser beam, to station B 202, forming reflected first beam 210. Substantially simultaneously with the transmitting from station A 200 of the first incident beam 208, station B 202 transmits a second incident beam 212 to station A 200, forming reflected second beam 214. One advantage of the present invention is that stations A and B may be stationary while the beams are being transmitted, reflected, and received.

Figure 6:
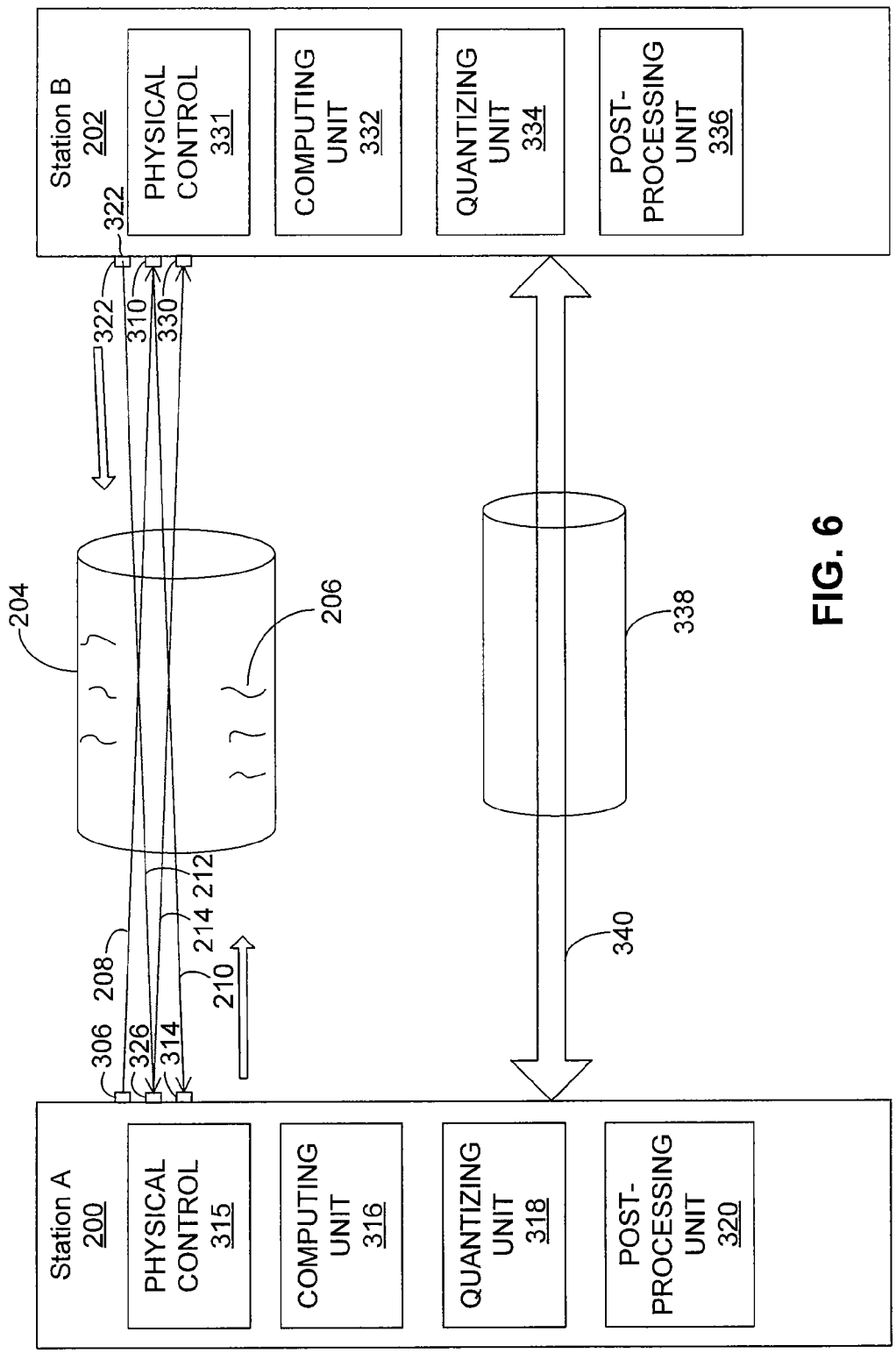
FIG. 6 is an illustration of an exemplary embodiment of the present invention.

FIG. 6 schematically shows an exemplary embodiment of the present invention showing main components of a system for generating identical numerical sequences at stations A and B. Station A 200 communicates with station B 202 through a communication channel 204. A physical control 315 at station A causes a transmitter 306 at station A 200 to transmit an incident first beam 208 to station B 202 at a first predetermined time. The incident first beam 208 is reflected by the reflector 310 at station B 202, forming a reflected first beam 210. The reflected first beam 210 is received by a receiver 314 at station A 200. A computing unit 316 at station A 200 compares the incident first beam 208 with the reflected first beam 210 and determines the first beam phase difference therebetween. A quantizing unit 318 at station A 200 quantizes the first beam phase difference into a first number based on predetermined criteria.

A physical control 331 at station B causes a transmitter 322 at station B 202 to transmit an incident second beam 212 to station A 200 at a second predetermined time. The physical control at station A 315 and the physical control at station B 331 may ensure that the timing of the transmitting of the incident first beam 208 and the incident second beam 212 are substantially simultaneous. The incident second beam 212 is reflected by the reflector 326 at station A 200, forming a reflected second beam 214. The reflected second beam 214 is received by a receiver 330 at station B 202. A computing unit 332 at station B 202 compares the incident second beam 212 with the reflected second beam 214 and determines the second beam phase difference therebetween. A quantizing unit 334 at station B 202 quantizes the second beam phase difference into a second number based on predetermined criteria.

Station A 200 and station B 202 generate each number in substantially duplicate numerical sequences using this process. Numerical discrepancies in the two numerical sequences may occur, due to, for example, substantial noise or phase jitter. Post-processing units may be added to an embodiment of the present invention to further improve it. In one embodiment, a post-processing module 320 at station A 200 and a post-processing module 336 at station B 202 correct any bit errors in the numerical sequences through the use of, for example, parity checks. Such a process is sometimes called information reconciliation.

Figure 7:
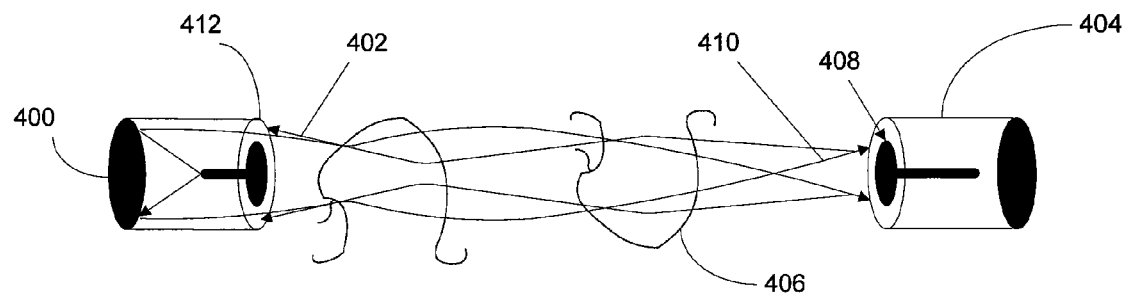
FIG. 7 is an illustration of phase distortion of a signal caused by atmospheric turbulence in accordance with an exemplary embodiment of the present invention.

FIG. 7 is an illustration of phase distortion of a signal caused by atmospheric turbulence in accordance with an exemplary embodiment of the present invention. In this embodiment, the beam transmitted between stations A and B is a laser beam, although the invention is not limited to the use of a laser beam. A first telescope 400 transmits a first laser pulse 402 toward a second telescope 404. The first laser pulse 402 interacts with warm and cold eddies in the atmosphere 406, which refract and modulate the first laser pulse 402. The first laser pulse 402 is reflected by a first mirror 408 at the second telescope B 404, forming a reflected first beam. The reflected first beam is then reflected back toward the first telescope 400.

Substantially simultaneously with the first transmitting, the second telescope 404 transmits a second laser pulse 410 toward the first telescope 400. The second laser pulse 410 interacts with warm and cold eddies in the atmosphere 406, which refract and modulate the second laser pulse 410. The second laser pulse 410 is reflected by a second mirror 412 at the first telescope 400, forming the second reflected beam. The second reflected beam is then reflected back toward the second telescope 404.

Figure 8:
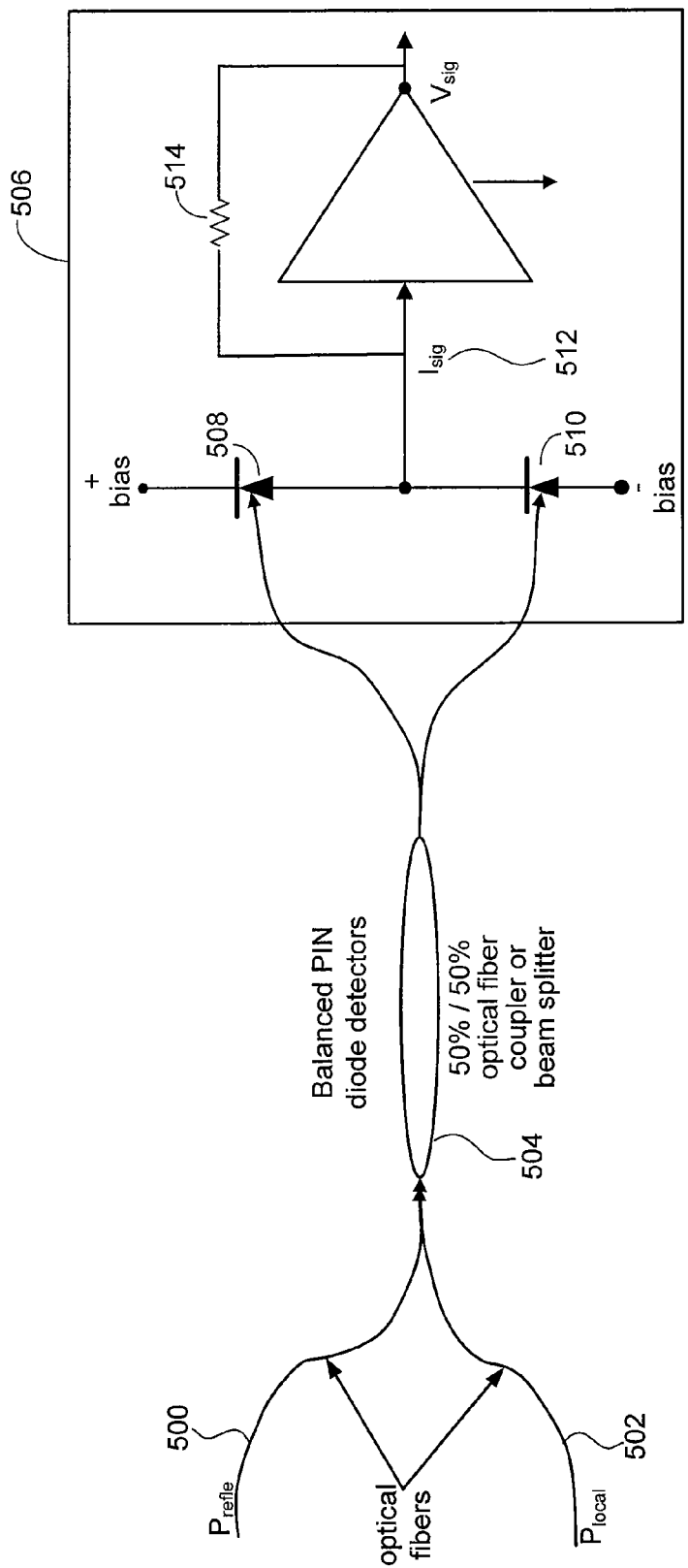
FIG. 8 is an illustration of an exemplary embodiment of a phase detection circuit.

FIG. 8 is an illustration of an exemplary embodiment of a phase detection circuit that can be used to measure a phase difference between incident and reflected beams. Optical power from a transmitted pulse travels along a first single mode, polarization preserving optical fiber 500. Optical power from a reflected pulse travels along a second single mode, polarization preserving optical fiber 502. Fiber 500 and fiber 502 are coupled together in 50%/50% polarization preserving optical fiber coupler 504 and decoupled and inputted at detector circuit 506 into balanced PIN diode photo detectors 508 and 510. The resulting signal 512 passes through the circuit having amplifier 516 and feedback resistor 514, producing electric signal 518, which has the form:

$$Vsig(t) \propto \{Prcvd \ast Plocal\}^{1/2} \cos \{\Delta\phi(t)\} + \text{noise},$$

where $\Delta\phi(t)$ is defined as the phase differential between transmitted and reflected signals due to index of refraction variations in the atmosphere, Prcvd is the optical power received from the reflected pulse and Plocal is the optical power from the transmitted pulse. Since $\Delta\phi(t)$ is a stochastic process distributed about zero, the generation of a random bit sequence from $\Delta\phi(t)$ can be accomplished by coherent detection of Vsig.

Figure 9:
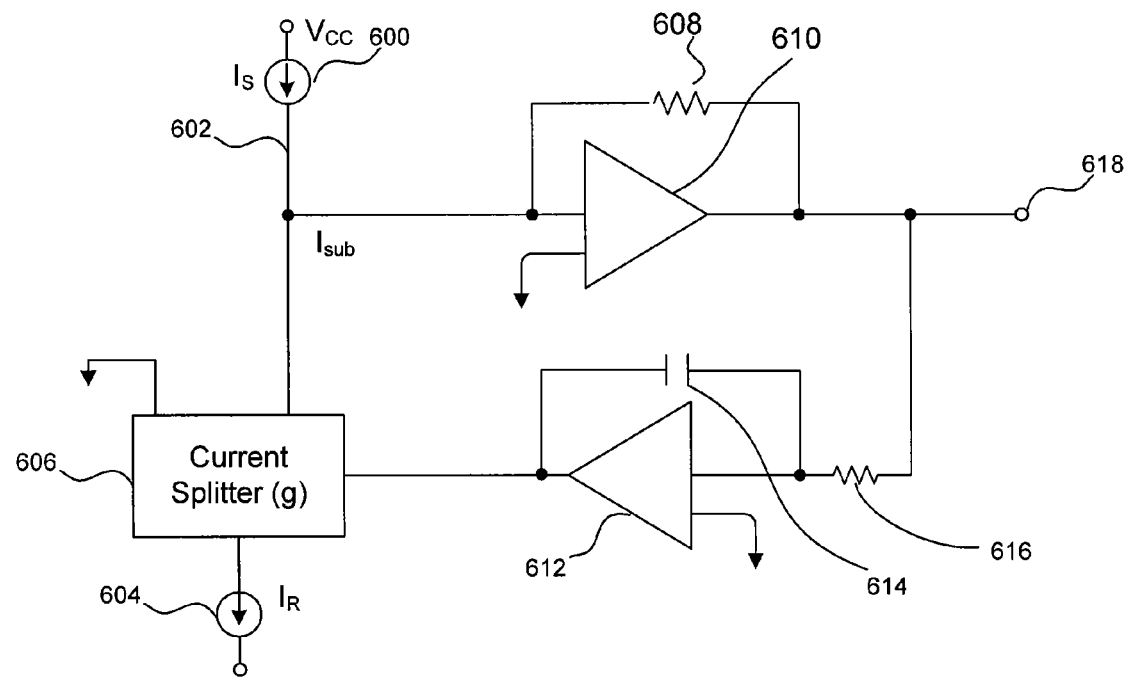
FIG. 9 is an alternative embodiment of a phase detection circuit.

FIG. 9 is a schematic diagram showing an alternative embodiment of a phase detection circuit. It is a schematic of a Model 2017 auto-balanced photoreceiver, which acts as a variable-gain beam splitter. The circuit consists of a signal photodiode, with current $I_S$ 600, a reference photodiode with current $I_R$ 604, a current splitter 606, a current subtraction node 602, a feedback amplifier 610, with associated feedback resistor $R_f$ 608, and a transresistance amplifier 612, with associated capacitor 614 and resistor 616. The output 618 of the photodetector can be expressed by the formula:

$$A = (I_S - g \cdot I_R) \cdot R_f$$

Laser amplitude noise is cancelled when the DC value of Isub, the current from the current subtraction node 602 equals the signal current $I_S$ 600.

Figure 10:
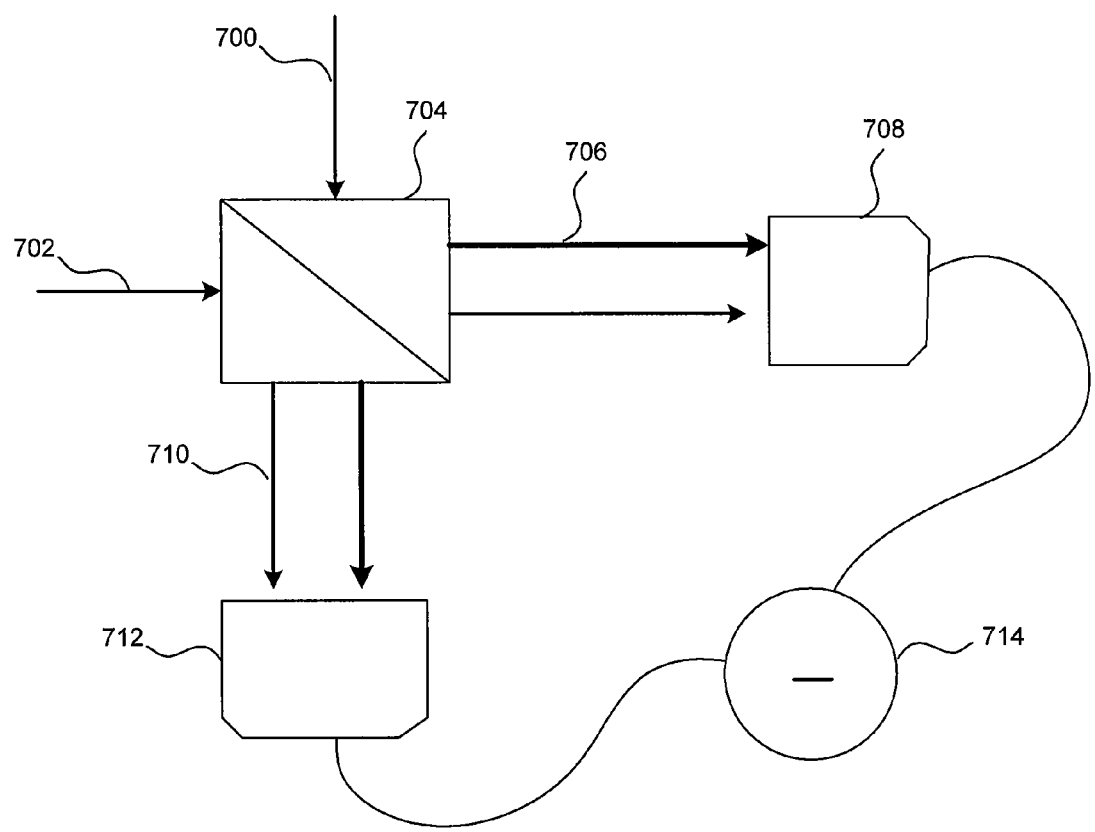
FIG. 10 is an illustration depicting one embodiment of a method to detect the phase difference between two signals.

FIG. 10 is an illustration depicting one embodiment of a method to detect the phase difference between two signals. A reference beam 7A00 and a signal beam 7A02 are input into a beam splitter 7A04. The beam splitter 7A04 inputs the resulting split beams 7A06 and 7A10 into balanced PIN diode photo detectors 7A08 and 7A12 a phase detection circuit, as illustrated in FIGS. 5 and 6. The phase detection circuit computes a difference signal 7A14.

Figure 11:
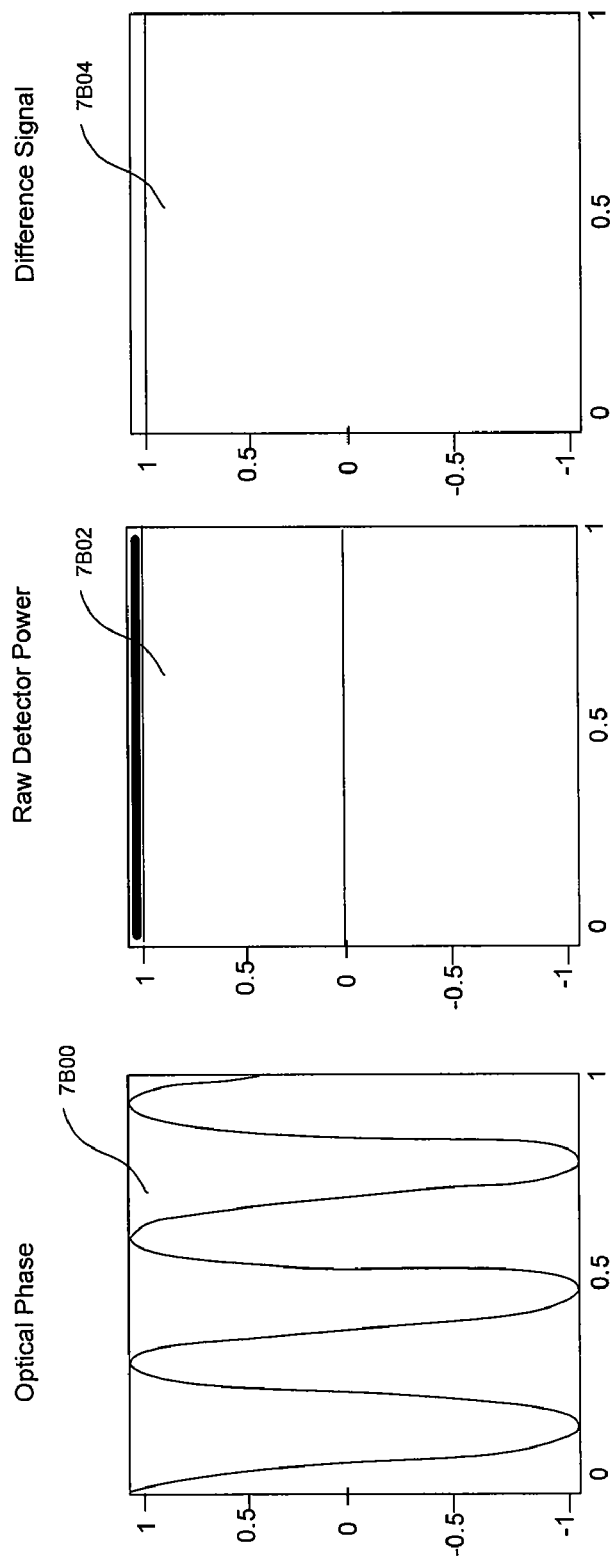
FIG. 11 is a graphical illustration of signals associated with the circuit in FIG. 10.

FIG. 11 is a graphical illustration of signals associated with the circuit in FIG. 10. The optical phase 7B00, raw detector power 7B02, and difference signal 7B04 are shown. The resulting difference signal 7B04 measures binary phase in a way that is insensitive to power fluctuations in one or both beams.

Figure 12:
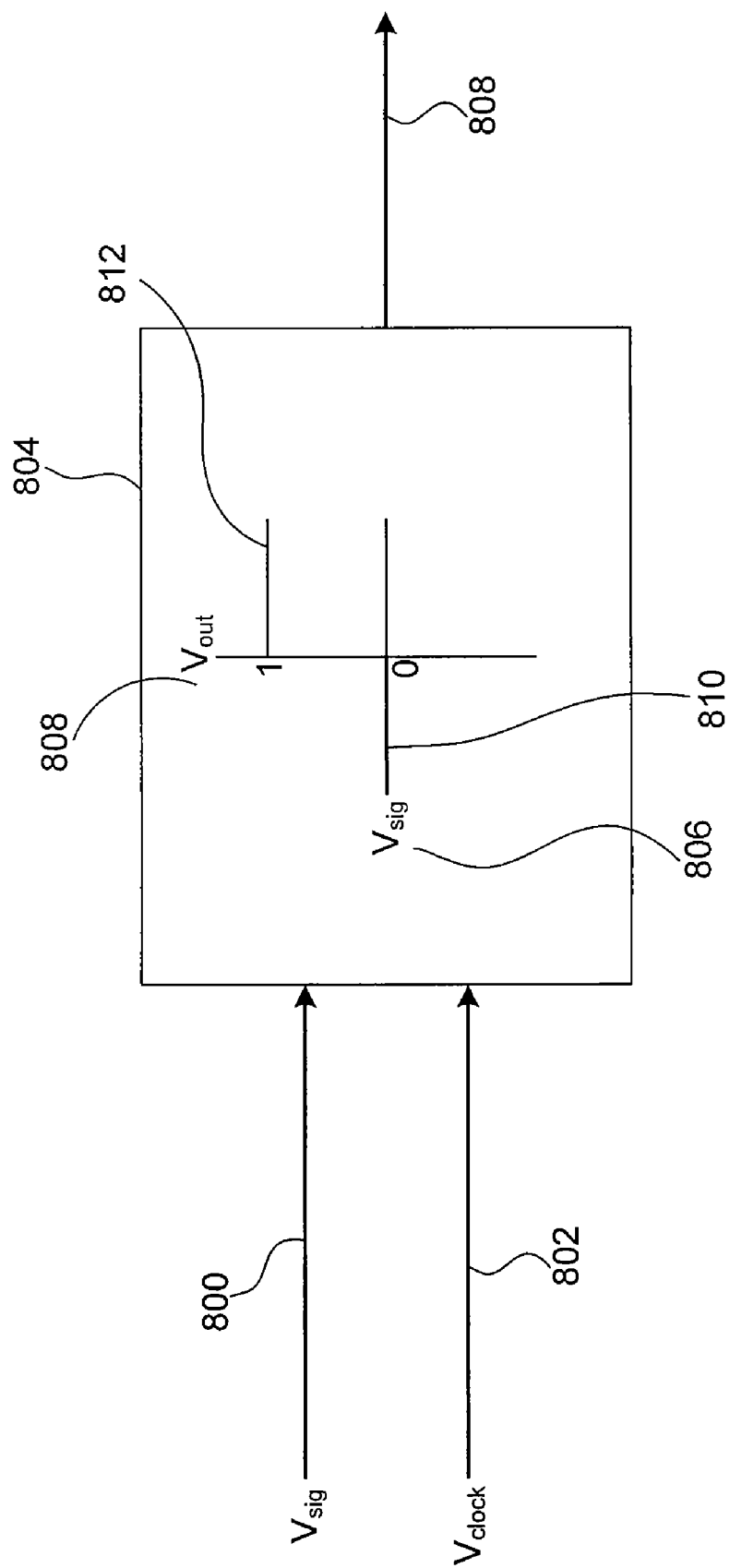
FIG. 12 is a graphical illustration depicting an exemplary method of converting a signal from a phase difference detection circuit into a binary number.

FIG. 12 is a graphical illustration depicting an exemplary method of converting a signal from a phase difference detection circuit into a binary number. The signal 800 and clock 802 are input into a comparator 804. The comparator 804 measures the signal voltage 806 and outputs a binary number 808. If the signal voltage 806 is less than or equal to 0 810, the comparator 804 will output a binary number of 0. If the signal voltage 806 is greater than 0 812, the comparator 804 will output a value of 1.

Figure 13:
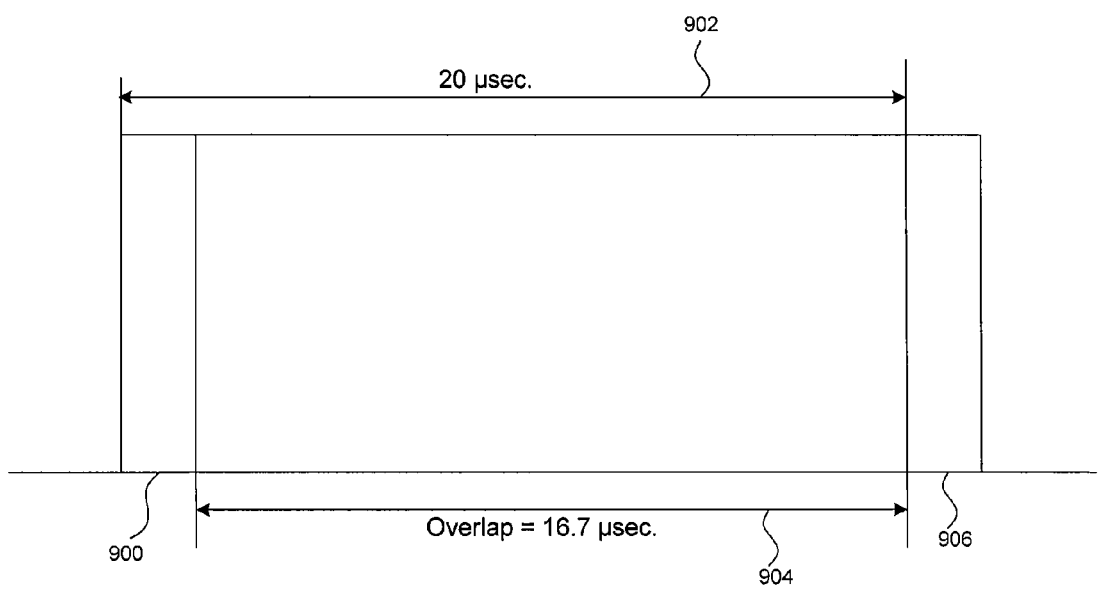
FIG. 13 is a diagram illustrating integration of a detected signal according to one embodiment of the present invention.

FIG. 13 is a diagram illustrating integration of a detected signal according to one embodiment of the present invention. The transmitted pulse 900 in this embodiment of the present invention has a duration 902. Since the received pulse 906 was transmitted at substantially the same time as the transmitted pulse was transmitted, a portion 904 of the duration of both the transmitted pulse 900 and the received pulse 906 overlaps. The detected signal 7B04 is integrated over the duration of the overlap 904. Measurement time can be varied to increase security. Integration of the detected signal 7B04 is important because if the time isn't synched, the channel is not reciprocal, which will cause errors to increase and the secret bit yield to decrease.

Figure 14:
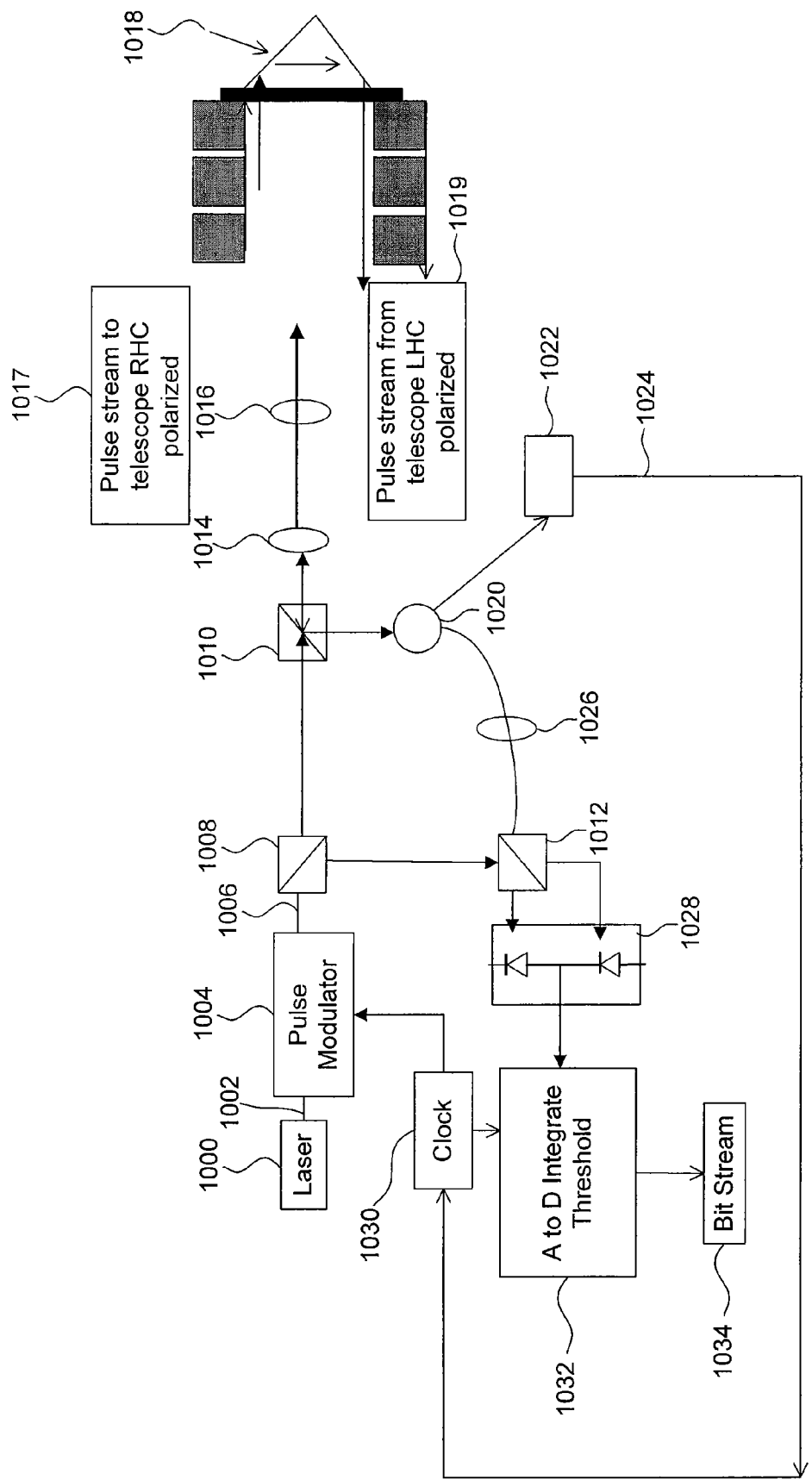
FIG. 14 is a block diagram depicting one embodiment of a transceiver that may be used at a station.

FIG. 14 is a block diagram depicting one embodiment of a transceiver that may be used at a station. A laser 1000 is connected with an optical fiber 1002 to a pulse modulator 1004. The pulse modulator 1004 is connected with a second optical fiber 1006 to beam splitters 1008, 1010, and 1012 using polarization preserving fiber couplers. The signal is sent through a beam expander 1014 and a waveplate 1016 and then sent to a retroreflector 1018 at station B. The retroreflector 1018 may be based, for example, on a hollow core retroreflector corner cube, an optical fiber circulator, or an optical fiber Bragg reflector. The pulse stream transmitted to the telescope at station B is right hand circular (RHC) polarized 1017, and the reflected pulse stream is left hand circular (LHC) polarized 1019. Beamsplitter 1010 sends the reflected beam to an arrayed waveguide grating (AWG) 1020, which is used for filtering and pickoff for timing synchronization. The reflected signal is sent through a polarizer 1026 and a beam splitter 1012. Beamsplitter 1012 also receives the transmitted pulse stream from beamsplitter 1008. Both the transmitted pulse stream and the reflected pulse stream are sent to a balanced PIN diode photo detector 1028. The reflected pulse stream is sent from AWG 1020, passed through a timing photodetector 1022, and input 1024 into a clock 1030. The output from the balanced PIN diode photo detector 1028 is integrated 1032 and transformed into a bit stream 1034.

Figure 15:
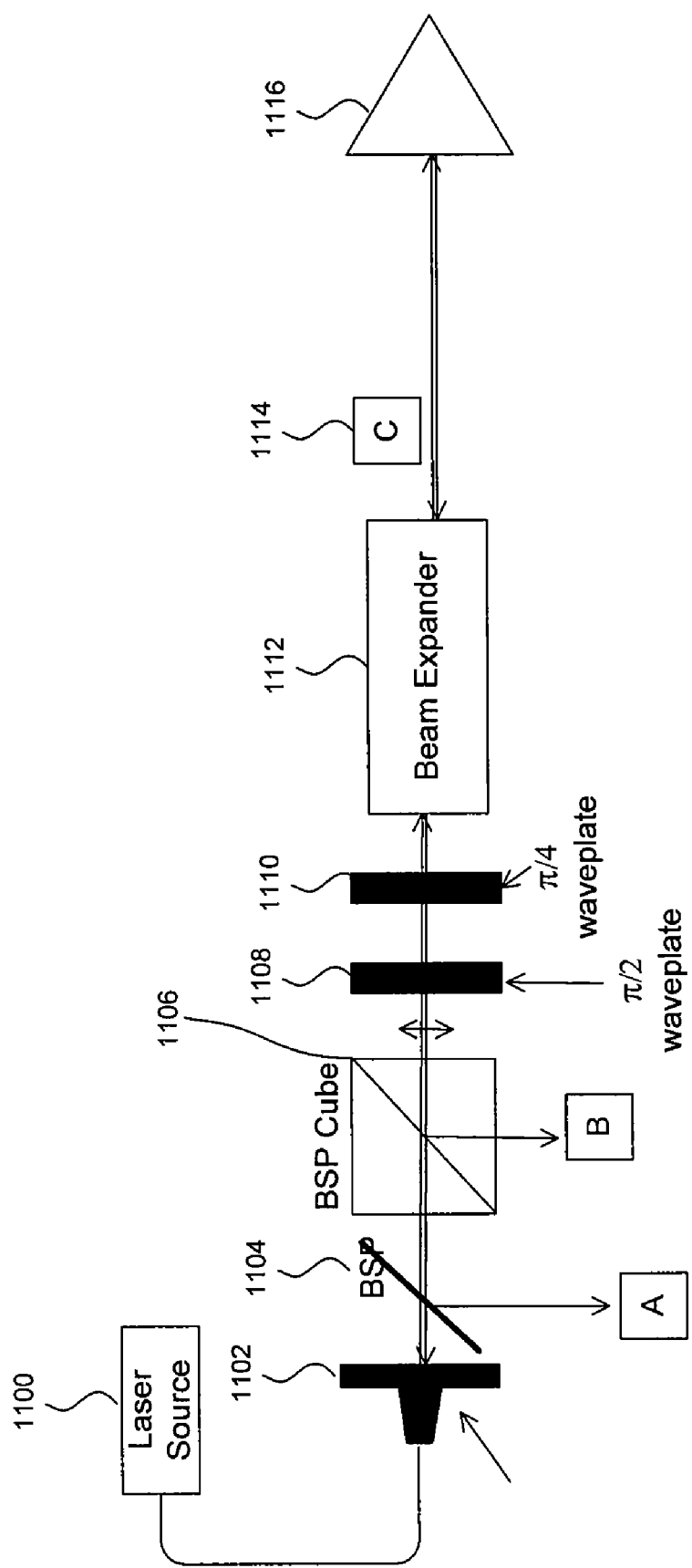
FIG. 15 is a diagram of a lab setup to measure the degree to which the retroreflector preserves the polarization of the beam upon reflection

FIG. 15 is a diagram of a lab setup to measure the degree to which the retroreflector preserves the polarization of the beam upon reflection. This setup measures the isolation between the polarization states of the transmitted and reflected beams. A laser source 1100 at a first station is connected through a fiber port 1102 to a beam splitter 1104. A polarizing beamsplitting cube (PBSP Cube) 1106 horizontally polarizes the light. The combination of the π/2 1108 and π/4 1110 waveplates creates circularly polarized light, which is transmitted to a hollow retroreflector 1116 at a second station. The hollow retroreflector 1116 preserves the circular polarization of the beam and reflects the beam back toward the first station. The retroreflector 1116 may be based, for example, on a hollow core retroreflector corner cube, an optical fiber circulator, or an optical fiber Bragg reflector.

Figure 16:
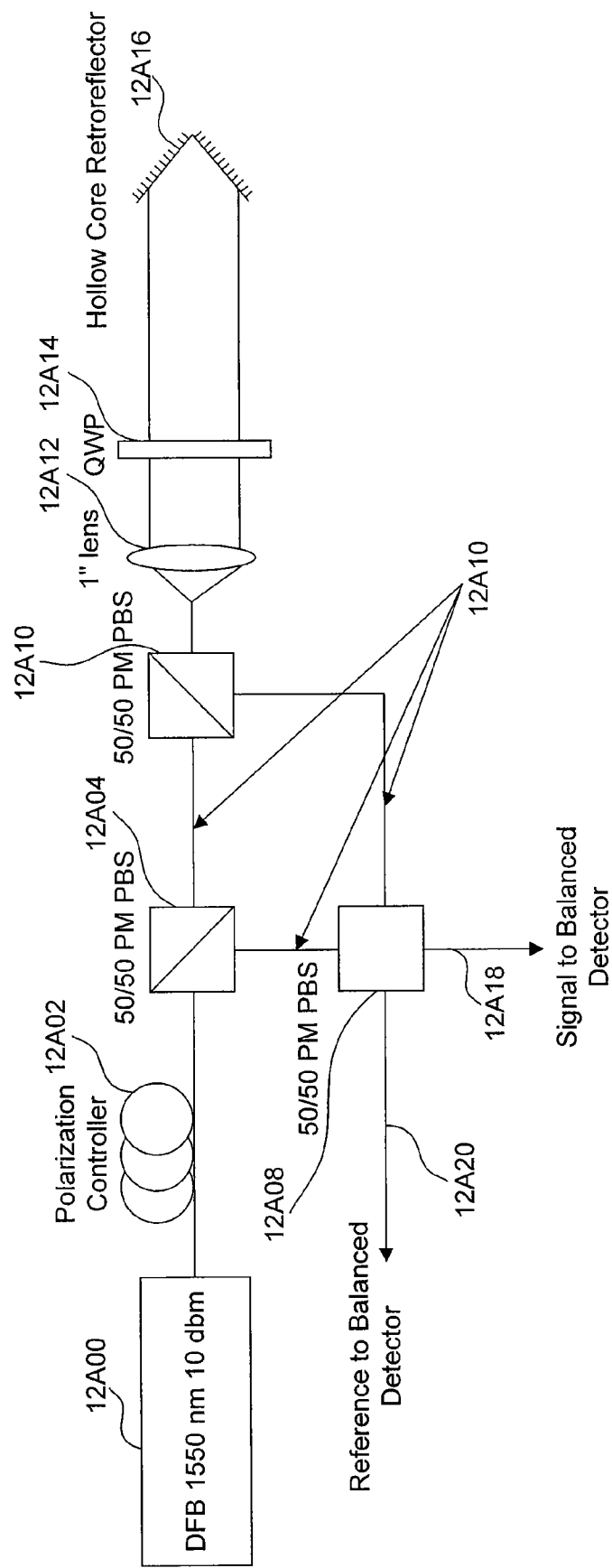
FIG. 16 is a schematic of a breadboard layout of an alternative embodiment of the present invention.

FIG. 16 is a schematic of a breadboard layout of an alternative embodiment of the present invention. The signal from DFB 12A00 is input into a polarization controller 12A02 and then into polarizing beamsplitters 12A04, 12A08, and 12A10, which are connected with polarization maintaining fibers 12A10. The signal passes through polarizing beamsplitter 12A10 into a lens 12A12 and a π/4 waveplate 12A14. The signal is transmitted toward a hollow retroreflector 12A16, which reflects the beam to polarizing beamsplitter 12A10. The retroreflector 12A16 may be based, for example, on a hollow core retroreflector corner cube, an optical fiber circulator, or an optical fiber Bragg reflector. Polarizing beamsplitter 12A08 gets input from polarizing beamsplitters 12A04 and 12A10 and inputs the signal 12A18 and reference 12A20 to a balanced PIN diode photo detector.

Figure 17:
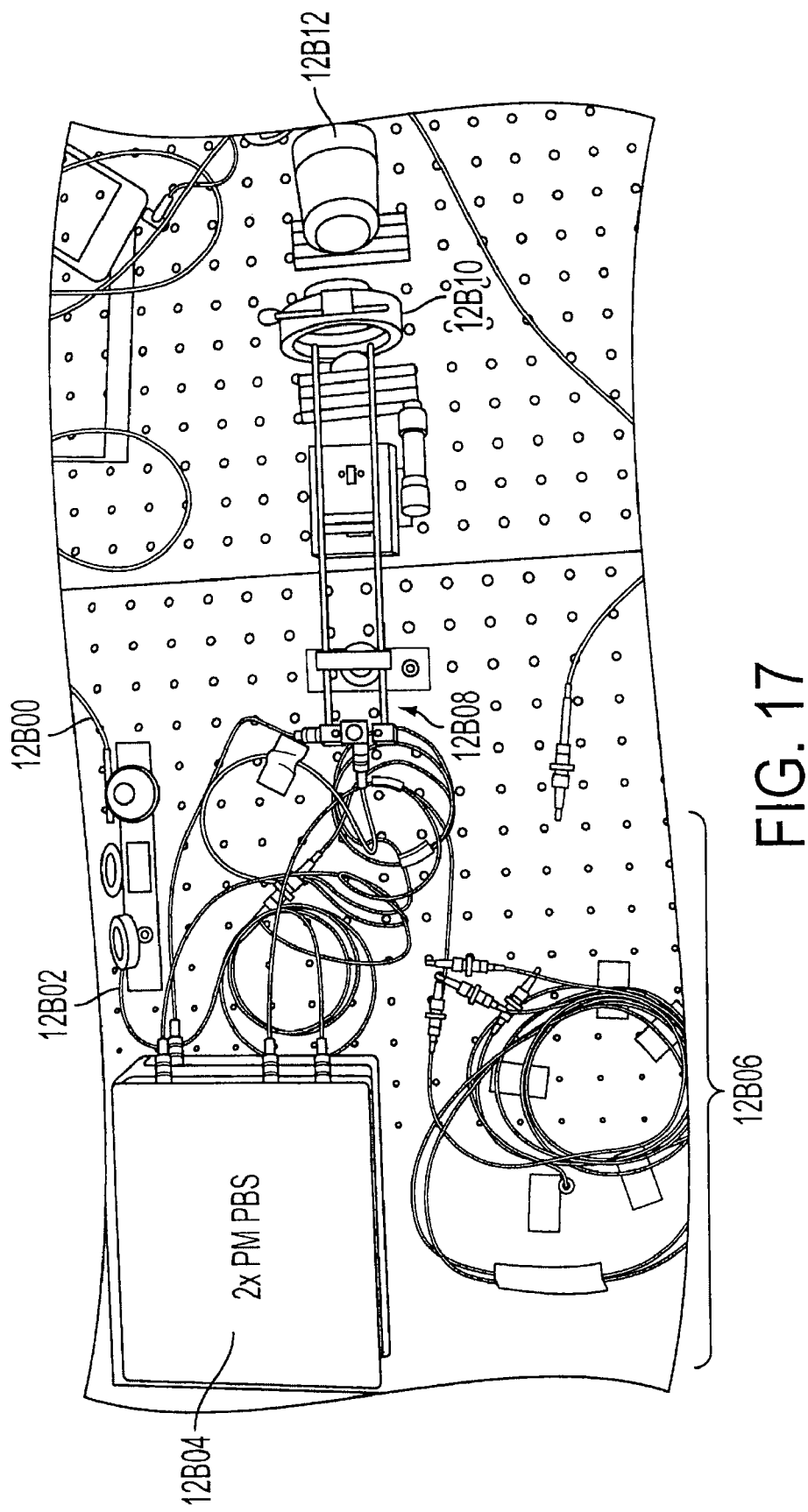
FIG. 17 is a photograph a breadboard layout of the alternative embodiment of the present invention in accordance with FIG. 16.

FIG. 17 is a picture of a breadboard layout of the alternative embodiment of the present invention in accordance with FIG. 16. Input from a laser 12B00 is passed through a polarization controller 12B02 and sent to a polarization maintaining fiber coupler 1204. The signal from the polarization maintaining fiber coupler 12B04 is input into a collimator 12B08 and then passed through a π/4 waveplate 12B10. The signal is reflected from a retroreflector 12B12. The retroreflector 12B12 may be based, for example, on a hollow core retroreflector corner cube, an optical fiber circulator, or an optical fiber Bragg reflector. A fiber-based interferometer, which may be used to measure phase, is also shown in this picture 12B06.

Figure 18:
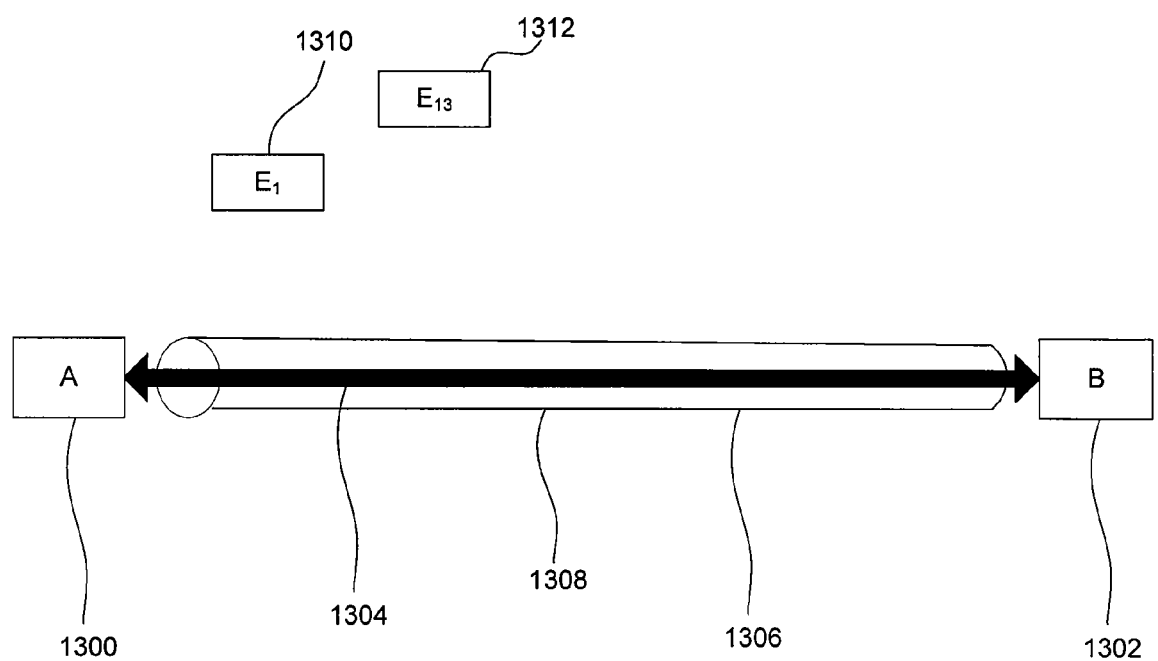
FIG. 18 is an illustration depicting the secrecy assurance capabilities of an exemplary embodiment of the present invention.

FIG. 18 is an illustration depicting the secrecy assurance capabilities of an exemplary embodiment of the present invention. In one embodiment, station A 1300 with station B 1302 communicates along communication path 1304 through physical communication channel 1306 having physical property 1308 capable of inducing a phase shift in transmitted beams. An eavesdropper positioned at a location 1310 relatively close to a station will not be able to observe a substantial amount of the communication between station A 1300 and station B 1304 because the spatial coherence within the beam slowly decreases from the center of the beam to the edges. As an eavesdropper moves from a location 1310 relatively close to a station to a location 1312 farther away from a station, the eavesdropper will only be able to recover a vanishingly small amount of information reconciled by station A 1300 and station B 1302.

Figure 19:
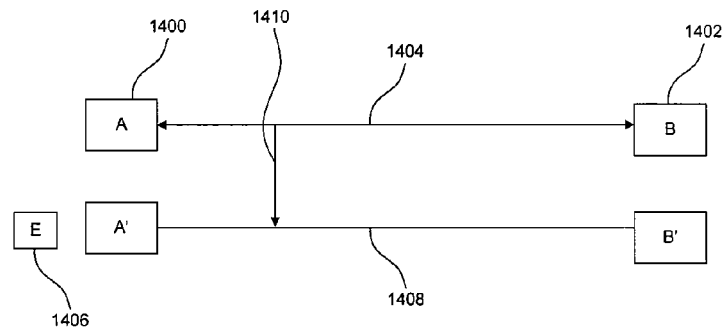
FIG. 19 is an illustration depicting the secrecy assurance capabilities of an exemplary embodiment of the present invention when an eavesdropper measures phase delay fluctuations along a parallel light path.

FIG. 19 is an illustration depicting the secrecy assurance capabilities of an exemplary embodiment of the present invention when an eavesdropper measures phase delay fluctuations along a parallel light path. In one embodiment, station A 1400 communicates with station B 1402 along a light path 1404. An eavesdropper 1406 measures phase delay fluctuations along a light path 1408 parallel to light path 1404. As the distance 1410 between light path 1408 and light path 1404 increases, the phase measured by eavesdropper 1406 along light path 1408 becomes less correlated with that within the beam along light path 1404. The phase coherence length is the distance 1410 traverse to the beam over which the measured phase remains well-correlated with that within the beam and is represented by the following equation:

$$r_c = (C_n^2 k^2 L)^{3/5},$$

where $r_c$ is the phase coherence length, $C_n^2$ is the atmospheric refractive index structure parameter, and L is the optical path length. Scintillation theory shows that the phase measurement of the eavesdropper is well-correlated to the measurements by station A 300 and station B 1402 only if the distance 1410 between light path 1408 and light path 1404 is less than $r_c$. If distance 1410 is greater than $r_0$, the eavesdropper will not obtain any significant knowledge from the final bit sequence observed by station A 1400 and station B 1402.

Figure 20:
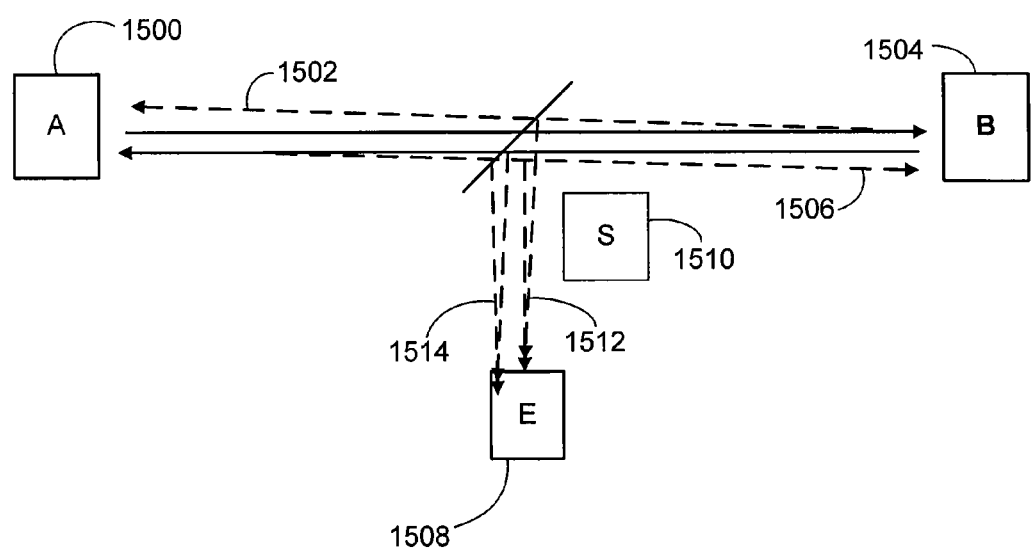
FIG. 20 is an illustration depicting the secrecy assurance capabilities of an exemplary embodiment of the present invention when an eavesdropper inserts a beam splitter into the beam path.

FIG. 20 is an illustration depicting the secrecy assurance capabilities of an exemplary embodiment of the present invention when an eavesdropper inserts a beam splitter into the beam path. In one embodiment, station A 1500 transmits pulses 1502 to station B 1504, and station B 1504 transmits pulses 1506 to station A 1500. An eavesdropper 1508 inserts a beam splitter 1510 into the beam path between station A 1500 and station B 1504, which sends transmitted pulses 1512 and reflected pulses 1514 to the eavesdropper 1508. The eavesdropper 1508 can then infer the phase delay measured by either station by comparing the transmitted pulses 412 with the reflected pulses 1514 obtained via the beam splitter 1510.

To mitigate the ability of eavesdropper 1508 to observe the communication between station A 1500 and station B 1504, station A 1500 and station B 1504 can stagger their measurements based upon a keyed pseudorandom code seeded by unused secret bits from the previous communication session between station A 1500 and station B 1504. In this case, the eavesdropper 1508 may have knowledge of the pulse timing but has no knowledge of which pulses station A 1500 and station B 1504 use to form the difference measurement that is the basis for the bit value. It is computationally impossible for an eavesdropper 1508 to determine the correct measurement sequence by continuously sampling the communication between station A 1500 and station B 1504 because, even at 0.1 kHz rates, this process entails trying $2^{200}$ combinations.

Figure 21:
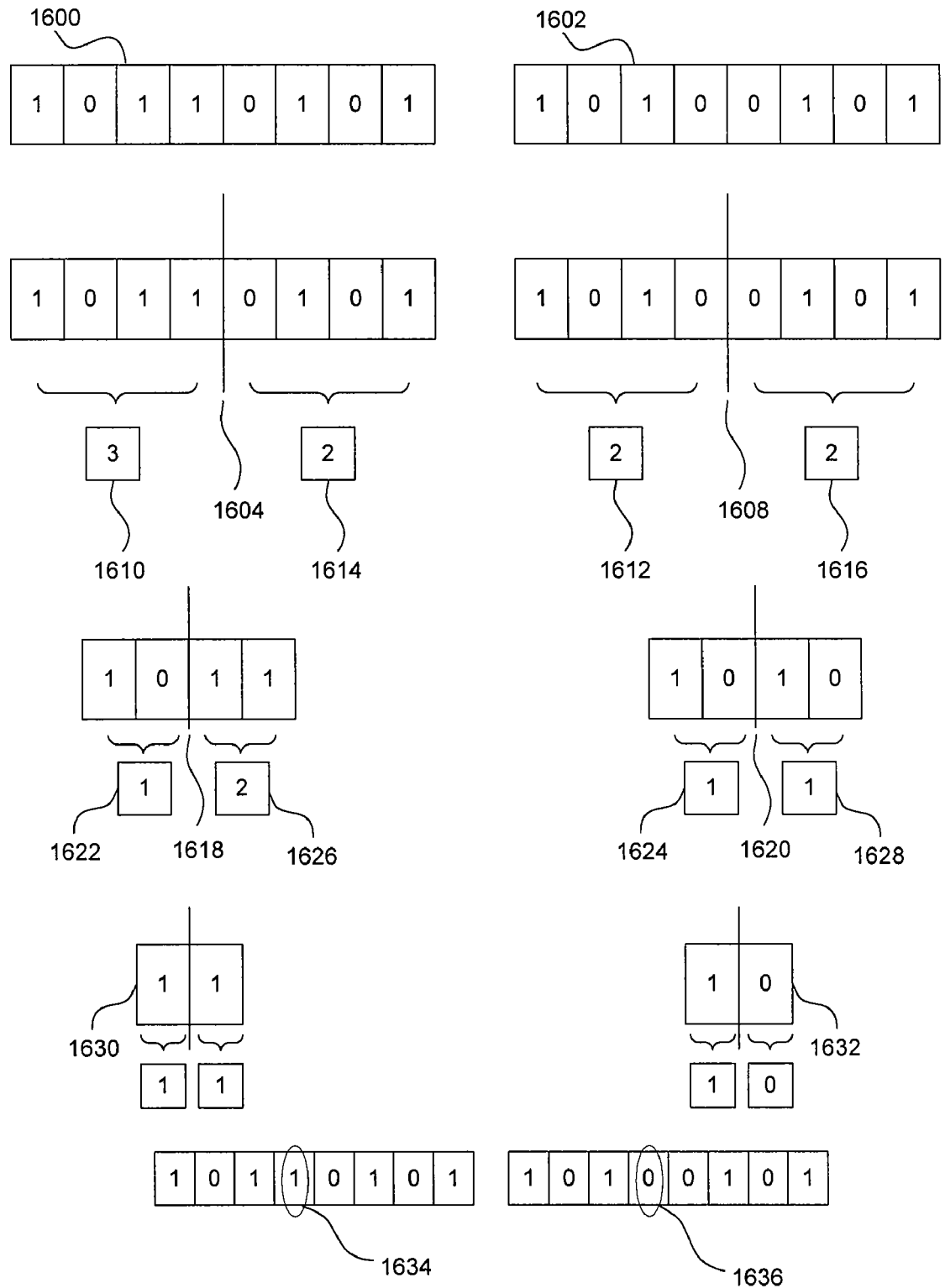
FIG. 21 is an illustration depicting one exemplary embodiment of information reconciliation by error correcting a sequence of bits using a parity check.

FIG. 21 depicts one exemplary embodiment of information reconciliation by error correcting a sequence of bits using a parity check. In one embodiment of information reconciliation, a parity check is sent from station A to station B, which in answer confirms the check or indicates and thus corrects the error. This process continues until station A and station B have confirmed that their shared strings are equal. In another embodiment of information reconciliation, station A sends a set of parity checks to station B, which uses them to decrypt its string using a fixed forward error correction decoding scheme. Other embodiments may adapt combinations of both of these examples.

For example, in an exemplary embodiment, a first bit sequence 1600 and a second bit sequence 1602 are given that should be identical but contain a discrepancy in one location. FIG. 21 presents a parity error correcting technique, one method to resolve the location of this discrepancy. It is to be understood, though, that any error correcting technique may be used. For example, a forward error correcting technique may also be used. Referring again to FIG. 21, in one embodiment of the present invention utilizing a parity error correcting technique, the first bit sequence 1600 is divided in half 1604 into two smaller bit sequences. Likewise the second bit sequence 1602 is divided in half 1608 into two smaller bit sequences. The sum 1610 of the bits in the first half of the first bit sequence 1600 is compared with the sum 1612 of the bits in the first half of the second bit sequence 1602. Likewise, the sum 1614 of the bits in the second half of the first bit sequence 1600 is compared with the sum 1616 of the bits in the second half of the second bit sequence 1602.

Since the sum 1610 of the bits in the first half of the first bit sequence 1600 is different from the sum 1612 of the bits in the first half of the second bit sequence 1602, the above process is repeated by comparing the first half of the first bit sequence 1600 with the bits from the first half of the second bit sequence 1602, and the bits are further divided to resolve the location of the bit where the discrepancy exists. In this case, the bits are further divided, 1618 and 1620. Sum 1622 is compared with sum 1624. Sum 1626 is compared with sum 1628. Since sum 1626 is different from sum 1628, the above process is repeated by examining the bits forming sum 1626 and sum 1628. The above process is again repeated, 1630 and 1632 until the location of the bit in each sequence of bits containing the discrepancy, 1634 and 1636, is found.

Once the error correction process of information reconciliation is finished, station A and station B may complete the protocol using an agreed upon privacy amplification process. Station A and station B each hash its identical numerical sequence using the procedure. One example is to use a specific cryptographic hash function, e.g., SHA512. In another example, station A and station B choose a random hash function using auxiliary statistically random bits.

The results of privacy amplification are shared random strings that may be used for any purpose a secret random number sequence is required, including as cryptographic keys in a communication protocol. These final keys may be checked for quality using a variety of randomness testing procedures. Stations A and B may use some of these secret random bits to bootstrap authentication for the next round of communication.

CONCLUSION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

What is claimed is:

1. A method of generating substantially identical numerical sequences at stations A and B, comprising:
   a) first transmitting an incident first beam from station A to station B through a communication channel having a physical property capable of modifying the incident first beam in a non-deterministic manner and reflecting the incident first beam from station B back toward station A, forming a reflected first beam;
   b) at station A, comparing the incident first beam and reflected first beam to determine a first beam phase difference therebetween;
   c) at station A, quantizing the first beam phase difference into a number based on predetermined criteria;
   d) substantially simultaneously with the first transmitting, second transmitting an incident second beam from station B to station A through the physical communication channel and reflecting the incident second beam from station A back toward station B, forming a reflected second beam;
   e) at station B, comparing the incident second beam and reflected second beam to determine a second beam phase difference therebetween;
   f) at station B, quantizing the second beam phase difference into a number based on the predetermined criteria; and
   g) repeating steps a) through f) in order to generate a series of numbers at both station A and station B, which are substantially identical because the incident first and second beams are subject to identical changes by traveling substantially identical paths.

2. The method according to claim 1 wherein the substantially identical numerical sequences are substantially identical binary sequences.

3. The method according to claim 1 wherein the beam is a laser beam and the communication channel is the earth's atmosphere.

4. The method of claim 1, wherein station A is within line of sight of station B.

5. The method of claim 1, wherein the distance between station A and station B is within 10 to 30 kilometers.

6. The method of claim 1, wherein station A and station B remain stationary while the incident first beam and the incident second beam are transmitted.

7. The method of claim 1, wherein the property capable of modifying the incident first beam in a non-deterministic manner is air turbulence.

8. The method of claim 1, wherein the physical property has a measurable characteristic that exceeds a predetermined threshold value.

9. The method of claim 1, wherein the predetermined criteria includes a table of numbers based on quantized ranges of phase difference.

10. The method according to claim 1 wherein the beam is electromagnetic radiation and the communication channel is the earth's atmosphere.

11. The method according to claim 10 wherein the communication channel is the earth's ionosphere.

12. The method according to claim 10 wherein the beam consists of radio frequency transmissions.

13. The method of claim 1, further comprising:
    error correcting the substantially identical numerical sequences.

14. The method of claim 13, wherein the error correcting utilizes a parity error correcting technique.

15. The method of claim 13, wherein the error correcting utilizes a forward error correcting technique.

16. The method of claim 1, further comprising implementing privacy amplification.

17. The method of claim 16, wherein the privacy amplification comprises reducing the sequence of identical bits held by stations A and B by hashing.

18. The method of claim 16, wherein the degree of privacy amplification is a function of estimates of the amount of information from the substantially identical numerical sequences an eavesdropper may possess.

19. The method of claim 1, further comprising:
    verifying that stations A and B are communicating only with each other.

20. The method of claim 19 wherein the verifying comprises communicating between stations A and B a message containing numbers independently produced by stations A and B during a previous communication session between station A and station B.

21. A method of communication between party A associated with station A and party B associated with station B, comprising:
    a) first transmitting an incident first beam from station A to station B through a communication channel having a physical property capable of modifying the incident first beam in a non-deterministic manner and reflecting the incident first beam from station B back toward station A, forming a reflected first beam;
    b) at station A, comparing the incident first beam and reflected first beam to determine a first beam phase difference therebetween;
    c) at station A, quantizing the first beam phase difference into a number based on predetermined criteria;
    d) substantially simultaneously with the first transmitting, second transmitting an incident second beam from station B to station A through the physical communication channel and reflecting the incident second beam from station A back toward station B, forming a reflected second beam;

e) at station B, comparing the incident second beam and reflected second beam to determine a second beam phase difference therebetween;

f) at station B, quantizing the second beam phase difference into a number based on the predetermined criteria; and g) repeating steps a) through f) in order to generate a series of numbers at both station A and station B, which are substantially identical because the incident first and second beams are subject to identical changes by traveling substantially identical paths;

h) generating a key from each of the substantially identical numerical sequences; and i) communicating between parties A and B using the key.

22. The method according to claim 21, wherein the communication is encrypted communication.

23. The method according to claim 21 wherein the substantially identical numerical sequences are substantially identical binary sequences.

24. The method according to claim 21, wherein the beam is a laser beam and the communication channel is the earth's atmosphere.

25. The method according to claim 21, wherein the beam is electromagnetic radiation and the communication channel is the earth's atmosphere.

26. The method according to claim 21, wherein the communication channel is the earth's ionosphere.

27. The method according to claim 21, wherein the beam consists of radio frequency transmissions.

28. The method of claim 21, wherein station A is within line of sight of station B.

29. The method of claim 21, wherein the property capable of modifying the incident first beam in a non-deterministic manner is air turbulence.

30. The method according to claim 21, further comprising: error correcting the substantially identical numerical sequences.

31. The method according to claim 30, wherein the error correcting utilizes a parity error correcting technique.

32. The method of claim 21, further comprising implementing privacy amplification.

33. The method of claim 32, wherein the privacy amplification comprises reducing the sequence of identical bits held by stations A and B by hashing.

34. The method of claim 32, wherein the degree of privacy amplification is a function of estimates of the amount of information from the substantially identical numerical sequences an eavesdropper may possess.

35. The method of claim 21, further comprising:
verifying that stations A and B are communicating only with each other.

36. The method of claim 35 wherein the verifying comprises communicating between stations A and B a message containing numbers independently produced by stations A and B during a previous communication session between station A and station B.

37. A system for generating substantially identical numerical sequences at stations A and B comprising:

a) a transmitter at station A for transmitting an incident first beam to station B;

b) a reflector at station B for reflecting the incident first beam back to station A and forming the reflected first beam;

c) a receiver at station A for receiving the reflected first beam;

d) a computing unit at station A for comparing the incident first beam and reflected first beam and determining a first beam difference induced by a physical property capable of modifying the incident first beam in a non-deterministic manner;

e) a quantizing unit at station A for quantizing the first beam difference into a number based on predetermined criteria;

f) a transmitter at station B for transmitting an incident second beam to station A;

g) a reflector at station A for reflecting the incident second beam back to station B and forming the reflected second beam;

h) a receiver at station B for receiving the reflected second beam;

i) a computing unit at station B for comparing the incident second beam and reflected second beam and determining a second beam difference induced by a physical layer traversed by the second beam; and j) a quantizing unit at station B for quantizing the second beam difference into a number based on predetermined criteria.

38. The system of claim 37, wherein the transmitter at station A and the transmitter at station B are laser transmitters and the first and second beams are laser beams.

39. The system of claim 37, wherein the reflectors at stations A and B are retroreflectors.

40. The system of claim 37, wherein the reflectors at stations A and B comprise optical circulators.

41. The system of claim 37, wherein the reflectors at stations A and B are optical fiber Bragg reflectors.

42. The system of claim 37, further comprising an error correcting module at station A and an error correcting module at station B.

43. The system of claim 37, further comprising a physical control unit at station A for controlling the transmitter at station A and a physical control unit at station B for controlling the transmitter at station B.

44. The system according to claim 37, wherein the beam is a laser beam.

45. The system according to claim 37, wherein the beam is electromagnetic radiation.

46. The system of claim 37, wherein station A is within line of sight of station B.

47. The system of claim 37, wherein the property capable of modifying the incident first beam in a non-deterministic manner is air turbulence.

48. The system of claim 37, further comprising a post-processing unit at station A and a post-processing unit at station B for error correcting a numerical sequence.

49. The system according to claim 48, wherein the post-processing units utilize a parity error correcting technique.

50. The system of claim 48, wherein the post-processing units implement privacy amplification.

51. The system of claim 50, wherein the privacy amplification comprises reducing the sequence of identical bits held by stations A and B by hashing.

52. The system of claim 50, wherein the degree of privacy amplification is a function of the estimates of the amount of information from substantially identical numerical sequences an eavesdropper may possess.

53. The system of claim 37, further comprising:
verifying that stations A and B are communicating only with each other.

54. The system of claim 53 wherein the verifying comprises communicating between stations A and B a message containing numbers independently produced by stations A and B during a previous communication session between station A and station B.

* * * * *